United States Patent
Durham et al.

(10) Patent No.: US 10,387,305 B2
(45) Date of Patent: Aug. 20, 2019

(54) TECHNIQUES FOR COMPRESSION MEMORY COLORING

(71) Applicant: INTEL CORPORATION, Santa Clara, CA (US)

(72) Inventors: David M. Durham, Beaverton, OR (US); Sergej Deutsch, Hillsboro, OR (US); Saeedeh Komijani, Mountain View, CA (US); Alpa T. Narendra Trivedi, Hillsboro, OR (US); Siddhartha Chhabra, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 95 days.

(21) Appl. No.: 15/390,359

(22) Filed: Dec. 23, 2016

(65) Prior Publication Data

US 2018/0181337 A1    Jun. 28, 2018

(51) Int. Cl.
*G06F 12/08* (2016.01)
*G06F 9/30* (2018.01)
*G06F 21/79* (2013.01)

(52) U.S. Cl.
CPC .......... *G06F 12/08* (2013.01); *G06F 9/30047* (2013.01); *G06F 21/79* (2013.01)

(58) Field of Classification Search
CPC ...... G06F 12/14; G06F 12/1425; G06F 21/79; G06F 21/78
See application file for complete search history.

(56) References Cited

U.S. PATENT DOCUMENTS

| | | | | | |
|---|---|---|---|---|---|
| 5,123,061 | A | * | 6/1992 | Pritchard | G06K 15/02 358/1.9 |
| 5,394,534 | A | * | 2/1995 | Kulakowski | G06F 3/0601 711/112 |
| 6,349,372 | B1 | * | 2/2002 | Benveniste | G06F 12/08 707/999.101 |
| 6,883,079 | B1 | * | 4/2005 | Priborsky | G06F 3/0613 709/247 |
| 8,131,952 | B2 | * | 3/2012 | Jang | G06F 12/08 710/68 |
| 8,489,824 | B2 | * | 7/2013 | Accapadi | G06F 12/0223 711/147 |

(Continued)

OTHER PUBLICATIONS

A Technique for High-Performance Data Compression, Terry A. Welch, Sperry Research Center, IEEE, 1984.*

(Continued)

*Primary Examiner* — Midys Rojas
*Assistant Examiner* — Khoa D Doan

(57) ABSTRACT

Techniques and computing devices for compression memory coloring are described. In one embodiment, for example, an apparatus may include at least one memory, at least on processor, and logic for compression memory coloring, at least a portion of the logic comprised in hardware coupled to the at least one memory and the at least one processor, the logic to determine whether data to be written to memory is compressible, generate a compressed data element responsive to determining data is compressible, the data element comprising a compression indicator, a color, and compressed data, and write the compressed data element to memory. Other embodiments are described and claimed.

22 Claims, 14 Drawing Sheets

(56) References Cited

U.S. PATENT DOCUMENTS

| | | | | |
|---|---|---|---|---|
| 8,745,338 B1* | 6/2014 | Yadav | G06F 17/30153 | 707/693 |
| 9,569,357 B1* | 2/2017 | Shalev | G06F 11/1453 | |
| 9,798,496 B2* | 10/2017 | Varghese | G06F 3/0661 | |
| 2002/0099907 A1* | 7/2002 | Castelli | G06F 12/0871 | 711/113 |
| 2004/0030847 A1* | 2/2004 | Tremaine | G06F 12/023 | 711/154 |
| 2004/0054858 A1* | 3/2004 | Chandrasekaran | G06F 3/0608 | 711/154 |
| 2004/0199729 A1* | 10/2004 | Ross | G06F 13/1631 | 711/150 |
| 2005/0251632 A1* | 11/2005 | Hsieh | G06F 12/0246 | 711/154 |
| 2006/0069879 A1* | 3/2006 | Inoue | G06F 13/28 | 711/147 |
| 2007/0226428 A1* | 9/2007 | Tremaine | G06F 12/0802 | 711/154 |
| 2008/0222460 A1* | 9/2008 | Kim | G11C 29/1201 | 714/702 |
| 2010/0077133 A1* | 3/2010 | Jeon | G11C 16/10 | 711/103 |
| 2010/0138614 A1* | 6/2010 | Glasco | G06F 12/0875 | 711/144 |
| 2011/0314235 A1* | 12/2011 | Kwon | G06F 3/0608 | 711/154 |
| 2012/0102277 A1* | 4/2012 | Kim | G06F 3/0608 | 711/154 |
| 2012/0131266 A1* | 5/2012 | Cho | G06F 12/04 | 711/103 |
| 2012/0290798 A1* | 11/2012 | Huang | G06F 3/0608 | 711/154 |
| 2013/0179752 A1* | 7/2013 | Shim | G06F 11/10 | 714/773 |
| 2013/0238865 A1* | 9/2013 | Kataoka | G06F 12/00 | 711/154 |
| 2013/0290281 A1* | 10/2013 | Yokoi | G06F 3/0608 | 707/693 |
| 2014/0146872 A1* | 5/2014 | Du | H04N 19/423 | 375/240.2 |
| 2014/0195702 A1* | 7/2014 | Seo | H03M 7/3084 | 710/53 |
| 2014/0359219 A1* | 12/2014 | Evans | G06F 12/0802 | 711/118 |
| 2015/0019813 A1* | 1/2015 | Loh | G06F 12/0866 | 711/122 |
| 2015/0019834 A1* | 1/2015 | Loh | G06F 12/023 | 711/208 |
| 2015/0178013 A1* | 6/2015 | Rostoker | G06F 3/0608 | 711/115 |
| 2015/0178214 A1* | 6/2015 | Alameldeen | G06F 12/0875 | 711/125 |
| 2015/0193342 A1* | 7/2015 | Ohara | G06F 12/0873 | 711/120 |
| 2016/0004642 A1* | 1/2016 | Sugimoto | G06F 3/06 | 711/128 |
| 2016/0011785 A1* | 1/2016 | Yeh | G06F 3/0655 | 711/103 |
| 2016/0342530 A1* | 11/2016 | Pellerin, III | G06F 12/0895 | |
| 2017/0147265 A1* | 5/2017 | Kingdon | G06F 11/108 | |
| 2018/0024958 A1* | 1/2018 | Nachimuthu | G06F 13/42 | |
| 2018/0329830 A1* | 11/2018 | Senior | G06F 3/0608 | |

OTHER PUBLICATIONS

Design and Performance of a Main Memory Hardware Data Compressor, Morten Kjelso, Loughborough University, IEEE, 1996.*

Chhabra et al., "Techniques for Data storage protection and integrity checking", U.S. Appl. No. 14/998,323, filed Dec. 24, 2015, 75 pages.

* cited by examiner

TECHNIQUES FOR COMPRESSION MEMORY COLORING

TECHNICAL FIELD

Embodiments described herein generally relate to information processing and, more specifically, but not exclusively, to techniques for memory management and protection.

BACKGROUND

Malware attacks using malicious code, such as viruses, worms, and Trojan horses, attempt to gain control of processing devices and to gain unauthorized accesses stored data. For instance, malware may implement memory-based attacks that operate to store malicious code in the memory of a computing system and exploit conditions within the system, such as use-after-free vulnerabilities or buffer overflows, to transfer control to the malicious code. For processing devices incorporating multiple hardware components that are capable of independent execution of instructions, malware may be employed to gain control over one or more hardware components to cause the components to improperly retrieve and/or manipulate data and/or executable instructions associated with other hardware components. For instance, in processing devices having a main processor component and one or more other hardware components capable of executing instructions independently of the main processor component, malware may operate to compromise instructions executed by one of the other hardware components to cause it to access data storage associated with the main processor component. Accordingly, such compromised hardware components may improperly retrieve data from main processor component storage devices for retransmission elsewhere or may to alter executable instructions that are to be executed by the main processor component as a mechanism to gain control over the main processor component. Memory-based malware attacks are becoming increasingly sophisticated and additional approaches to preventing such attacks may be desired.

DETAILED DESCRIPTION

Figure 1:
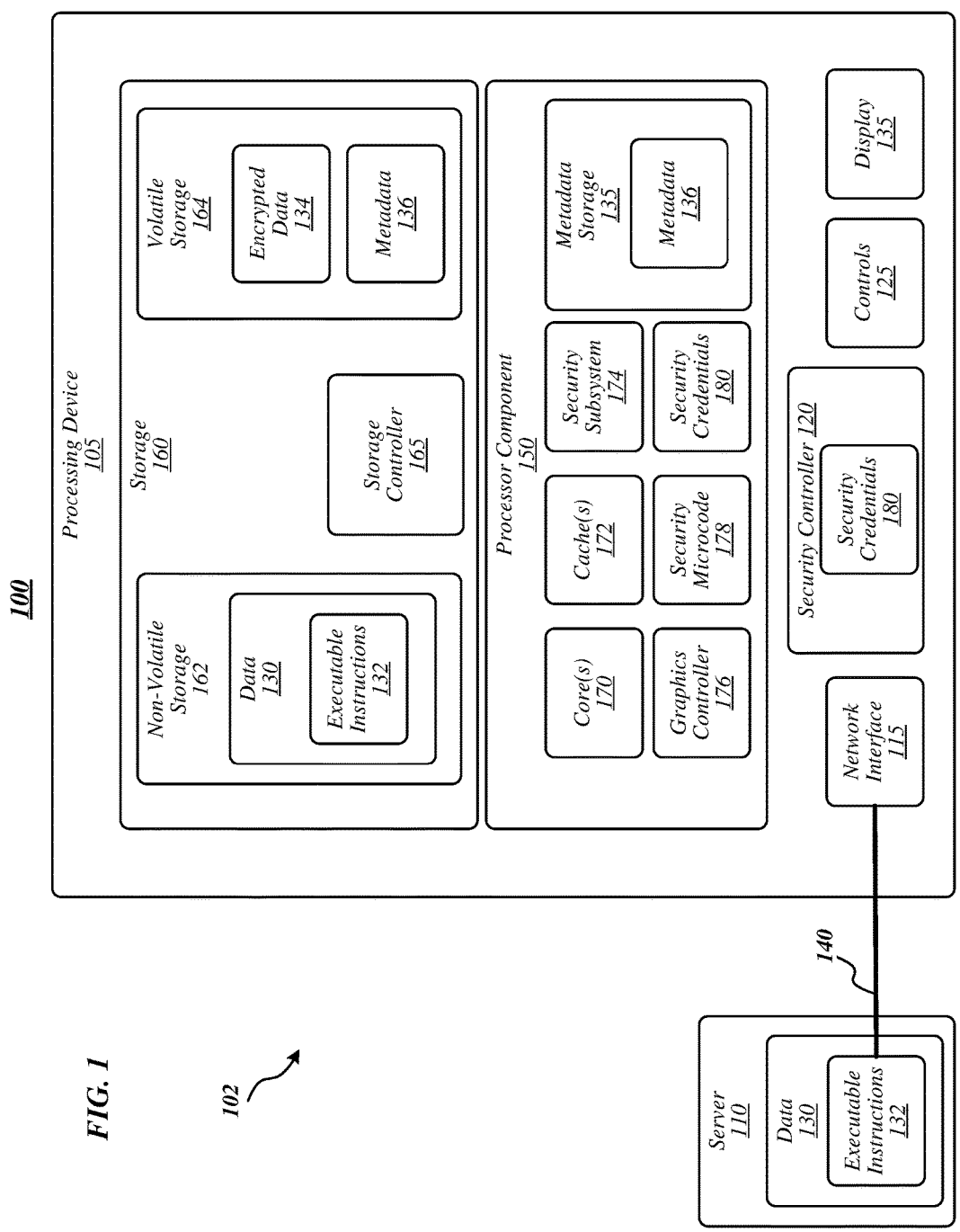
FIG. 1 illustrates an embodiment of a first operating environment.

Various embodiments may be generally directed toward systems and techniques for compression memory coloring. In some embodiments, compression memory coloring may include page coloring to associate memory pages with programs and their associated data. For example, embodiments may provide for assigning an attribute to memory pages to associate specific pages with specific programs and data. The attribute may be generally referred to as a page "color" and may be used to logically partition memory at a granularity fine enough to prevent one program from accessing the memory space of another program, parts of a single program from accessing the memory space of other parts of the same program, unauthorized memory accesses, and/or a direct memory access (DMA) attack. Techniques according to various embodiments may be implemented within existing page-based memory management data structures or nested page-based memory management data structures used by virtualization technologies (for example, a virtual machine (VM) environment). Accordingly, techniques according to the described embodiments may not degrade performance due to additional memory accesses for retrieving color information.

In some embodiments a compression memory coloring system may use or implement techniques using cache line (or "cacheline") compression to, for instance, include additional color metadata with cached data. In some embodiments, the color metadata may include an access control color. In various embodiments, color may be a part of a memory address or other metadata (for instance, color metadata) used to access control code, data in memory, and/or the like. If a correct address (for instance, a pointer) with the correct color is used to access similarly colored data, access to the data is allowed. Otherwise, an error may be generated indicating, for example, to a software application, that an access control violation has occurred. For example, in some embodiments, compression memory coloring may include associating a color (or color "tag") with a memory address to provide access control to code, data, and/or the like in memory. In various embodiments, data may be bound to the color tag and system hardware may verify that the color in the address and the color bound to the data match.

In various embodiments, the granularity of compression memory coloring may be at the cache line level (for example, 64 bytes) and the compression may be performed in hardware. Accordingly, compression memory coloring techniques according to some embodiments may provide a fine grain and high performance mechanism to detect incorrect memory accesses, such as memory access from malware, software vulnerabilities, buffer overflow/underflow, dangling pointers, memory scans, a compromised virtual machine (VM), a compromised operating system (OS), a compromised VM monitor (VMM), and/or the like. In various embodiments, color may be combined with actual data in memory (for instance, via compression). Therefore, in some embodiments, a compression memory coloring system may use hardware to enforce access control regardless of source, for instance, whether the source is a device, an accelerator using shared virtual memory (SVM), firmware, system management mode (SMM), virtual memory manager (VMM), direct memory access (DMA), a field-programmable gate array (FPGA), drivers, a kernel, and/or the like. In some embodiments, color may be used as part of a statistical method for catching access control violations. Accordingly, in various embodiments, statistical compression techniques may be used that avoid additional memory fetches required to disambiguate compressed cache lines from non-compressible cache lines, for example, which may forego color metadata.

In contrast, conventional methods do not fully address the issue of memory coloring and/or detecting unwanted data accesses and software vulnerabilities. For instance, conventional methods may require extra storage and/or redundant memory accesses to retrieve policy metadata from memory, thus, adding memory overhead, cost, and complexity while degrading system performance. For example, data corruption detection (DCD) and memory protection extensions (MPX) operate with process specific virtual lookup tables in the central processing unit (CPU) and, in addition, do not prevent malware attacks or other unwanted activity originating from separate processes such as VMs, VMMs, containers, kernals, threads, devices, and/or the like. Accordingly, compression memory coloring techniques according to some embodiments may combine access control information ("tags" or "color") with the actual data in memory, which may be enforced directly by hardware and cannot be bypassed by malicious or erroneous code.

In the following description, numerous specific details such as processor and system configurations are set forth in order to provide a more thorough understanding of the described embodiments. However, the described embodiments may be practiced without such specific details. Additionally, some well-known structures, circuits, and the like have not been shown in detail, to avoid unnecessarily obscuring the described embodiments.

FIG. 1 illustrates an example of an operating environment 100 such as may be representative of some embodiments. In operating environment 100, a compression memory coloring system 102 may include a server 110 and a processing device 105 coupled via a network 250. Server 110 and processing device 105 may exchange data 130 via network 140, and data 130 may include executable instructions 132 for execution within processing device 105. In some embodiments, data 130 may be include data values, executable instructions, and/or a combination thereof. Network 140 may be based on any of a variety (or combination) of communications technologies by which signals may be exchanged, including without limitation, wired technologies employing electrically and/or optically conductive cabling, and wireless technologies employing infrared, radio frequency, and/or other forms of wireless transmission.

In various embodiments, processing device 105 may incorporate a processor component 150, a storage 160, controls 125 (for instance, manually-operable controls), a display 135 and/or a network interface 115 to couple processing device 105 to network 140. Processor component 150 may incorporate security credentials 180, a security microcode 178, metadata storage 135 storing metadata 136, a security subsystem 174, one or more processor cores 179, one or more caches 172 and/or a graphics controller (GPU) 176. Storage 160 may include volatile storage 164, non-volatile storage 162, and/or one or more storage controllers 165. Processing device 105 may include a controller 120 (for example, a security controller) that may include security credentials 180.

Volatile storage 164 may include one or more storage devices that are volatile inasmuch as they require the continuous provision of electric power to retain information stored therein. Operation of the storage device(s) of volatile storage 164 may be controlled by storage controller 165, which may receive commands from processor component 150 and/or other components of processing device 105 to store and/or retrieve information therein, and may convert those commands between the bus protocols and/or timings by which they are received and other bus protocols and/or timings by which the storage device(s) of volatile storage 164 are coupled to the storage controller 165. By way of example, the one or more storage devices of volatile storage 164 may be made up of dynamic random access memory (DRAM) devices coupled to storage controller 165 via an interface, for instance, in which row and column addresses, along with byte enable signals, are employed to select storage locations, while the commands received by storage controller 165 may be conveyed thereto along one or more pairs of digital serial transmission lines. Some embodiments may utilize non-volatile memory instead of or in addition to DRAM.

Non-volatile storage 162 may be made up of one or more storage devices that are non-volatile inasmuch as they are able to retain information stored therein without the continuous provision of electric power. Operation of storage device(s) of non-volatile storage 162 may be controlled by storage controller 165 (for example, a different storage controller than used to operate volatile storage 164), which may receive commands from processor component 150 and/or other components of processing device 105 to store and/or retrieve information therein, and may convert those commands between the bus protocols and/or timings by which they are received and other bus protocols and/or timings by which the storage device(s) of non-volatile storage 162 are coupled to storage controller 165. By way of example, one or more storage devices of non-volatile storage 162 may be made up of ferromagnetic disk-based drives (hard drives) operably coupled to storage controller 165 via a digital serial interface, for instance, in which portions of the storage space within each such storage device are addressed by reference to tracks and sectors. In contrast, commands received by storage controller 165 may be conveyed thereto along one or more pairs of digital serial transmission lines conveying read and write commands in which those same portions of the storage space within each such storage device are addressed in an entirely different manner.

Processor component 150 may include at least one processor core 170 to execute instructions of an executable routine in at least one thread of execution. However, processor component 150 may incorporate more than one of processor cores 170 and/or may employ other processing architecture techniques to support multiple threads of execution by which the instructions of more than one executable routine may be executed in parallel. Cache(s) 556 may include a multilayer set of caches that may include separate first level (L1) caches for each processor core 170 and/or a larger second level (L2) cache for multiple ones of processor cores 170.

In some embodiments in which processing device 105 includes display 135 and/or graphics controller 176, one or more cores 170 may, as a result of executing the executable instructions of one or more routines, operate controls 125 and/or the display 135 to provide a user interface and/or to perform other graphics-related functions. Graphics controller 176 may include a graphics processor core (for instance, a graphics processing unit (GPU)) and/or component (not shown) to perform graphics-related operations, including and not limited to, decompressing and presenting a motion video, rendering a 2D image of one or more objects of a three-dimensional (3D) model, etc. Other forms of accelerators may include accelerators for sound, image processing, DSPs, reconfigurable logics such as FPGAs, and/or the like.

Non-volatile storage 162 may store data 130, including executable instructions 132. In the aforementioned exchanges of data 130 between processing device 105 and server 110, processing device 105 may maintain a copy of data 130, for instance, for longer term storage within non-volatile storage 162. Volatile storage 164 may store encrypted data 134 and/or metadata 136. Encrypted data 134 may be made up of at least a portion of data 130 stored within volatile storage 164 in encrypted and/or compressed form according to some embodiments described herein. Executable instructions 132 may make up one or more executable routines such as an OS, VM, VMM, device drivers, and/or one or more application routines to be executed by one or more processor cores 170 of processor component 150. Other portions of data 130 may include data values that are employed by one or more processor cores 170 as inputs to performing various tasks that one or more processor cores 170 are caused to perform by execution of executable instructions 132.

As part of performing executable instructions 132, one or more processor cores 170 may retrieve portions of executable instructions 132 and store those portions within volatile storage 164 in a more readily executable form in which addresses are derived, indirect references are resolved and/ or links are more fully defined among those portions in the process often referred to as loading. As familiar to those skilled in the art, such loading may occur under the control of a loading routine and/or a page management routine of an OS or VMM that may be among executable instructions 132. As portions of data 130 (including portions of executable instructions 132) are so exchanged between non-volatile storage 162 and volatile storage 164, security subsystem 174 may convert those portions of data 130 between what may be their original uncompressed and unencrypted form as stored within non-volatile storage 162, and a form that is at least encrypted and that may be stored within volatile storage 164 as encrypted data 134 accompanied by metadata 136.

Security subsystem 174 may include hardware logic configured or otherwise controlled by security microcode 178 to implement the logic to perform such conversions during normal operation of processing device 105. Security microcode 178 may include indications of connections to be made between logic circuits within the security subsystem 174 to form such logic. Alternatively or additionally, security microcode 178 may include executable instructions that form such logic when so executed. Either security subsystem 174 may execute such instructions of the security microcode 178, or security subsystem 174 may be controlled by at least one processor core 170 that executes such instructions. Security subsystem 174 and/or at least one processor core 170 may be provided with access to security microcode 178 during initialization of the processing device 105, including initialization of the processor component 150.

Security credentials 180 may include one or more values employed by security subsystem 174 as inputs to its performance of encryption of data 130 and/or of decryption of encrypted data 134 as part of performing conversions therebetween during normal operation of processing device 105. More specifically, security credentials 180 may include any of a variety of types of security credentials, including and not limited to, public and/or private keys, seeds for generating random numbers, instructions to generate random numbers, certificates, signatures, ciphers (such as AES), and/or the like. Security subsystem 174 may be provided with access to security credentials 180 during initialization of the processing device 105.

Figure 2:
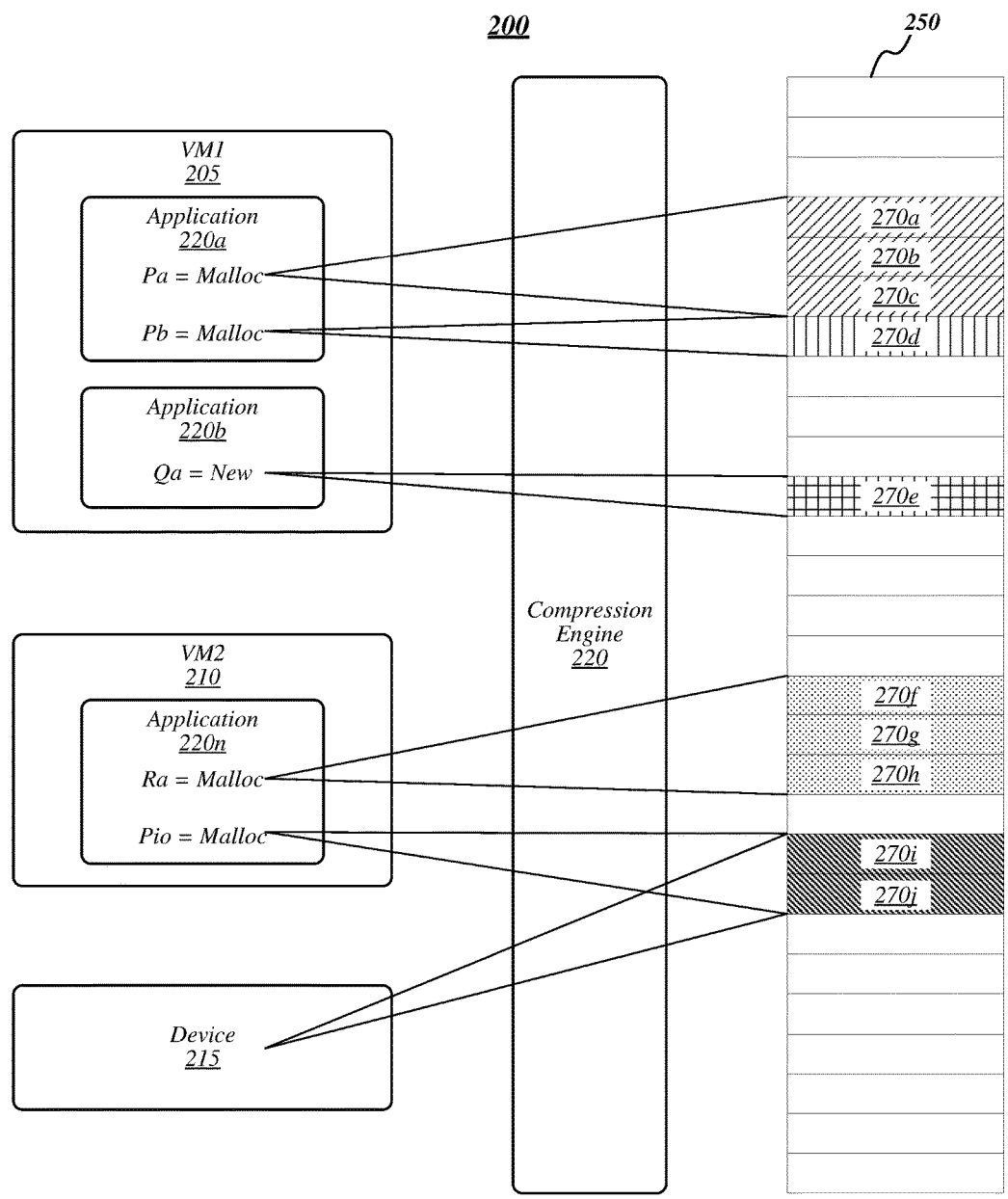
FIG. 2 illustrates an embodiment of a second operating environment.

FIG. 2 illustrates an example of an operating environment 200 such as may be representative of some embodiments. In operating environment 200, virtual machine 205 ("VM1"), virtual machine 210 ("VM2") are writing data to memory 250 and device 215 is operating to read data stored in memory 250. As shown in FIG. 2, memory 250 may be allocated and colored at a cache line granularity. For example, different processes or subroutines of application 220a (for example, "pa=malloc" and "pb=malloc") write to different memory locations 270a-c and 270d, respectively. Memory locations 270a-c and 270d are associated with different colors. Similarly, allocations of memory for different process of application 220n (for example, "ra=malloc" and "pio=malloc") may be written to different memory locations 270f-h and 270i and 270j, respectively. Compression engine 220 may operate to implement compression memory coloring according to some embodiments to facilitate writing to/reading from memory 250 using compression coloring techniques. In some embodiments, using different colors for adjacent memory may operate to prevent buffer overflow and/or underflow because incrementing a same pointer with a same color tag may eventually run into data associated with a different color tag, causing generation of an error (for example, via hardware). Similarly, malware scanning memory without knowing the correct color tags to access memory may also cause color violations, which may be detected.

In various embodiments, the color may only need to be known by the program segment (for instance, "pa=malloc" of application 220a) that allocated the data (for instance, in the pointer value retuned by a memory allocation ("malloc") or an object reference returned by new). In some embodiments, a memory allocation may randomly choose a color tag when allocating memory, include the color tag in the returned pointer value, and not retain the color tag. For instance, in some embodiments, the memory allocation process may be reminded when "free" is called to free the memory using the original pointer value. In various embodiments, the processor security microcode or hardware may directly assign colors without software control. For example, VM2 may be given a different allocation of color tag values than VM1, where VM1 cannot access color tag values assigned by the processor to VM2. Accordingly, since there may not be table or other software-accessible data structure storing color values (for instance, color tags) in memory, malware cannot access, guess, or otherwise determine which color tag to use when accessing memory contents and, therefore, cannot access data stored in memory 250 according to some embodiments without generating an error. Although there may not be a table or other data structure to store color values in memory, the color values may be tracked through color bits stored in virtual (for instance, logical) addresses, such that an application has a reference to the actual physical address and the correct color. The actual physical addresses may be stored in memory.

Figure 3:
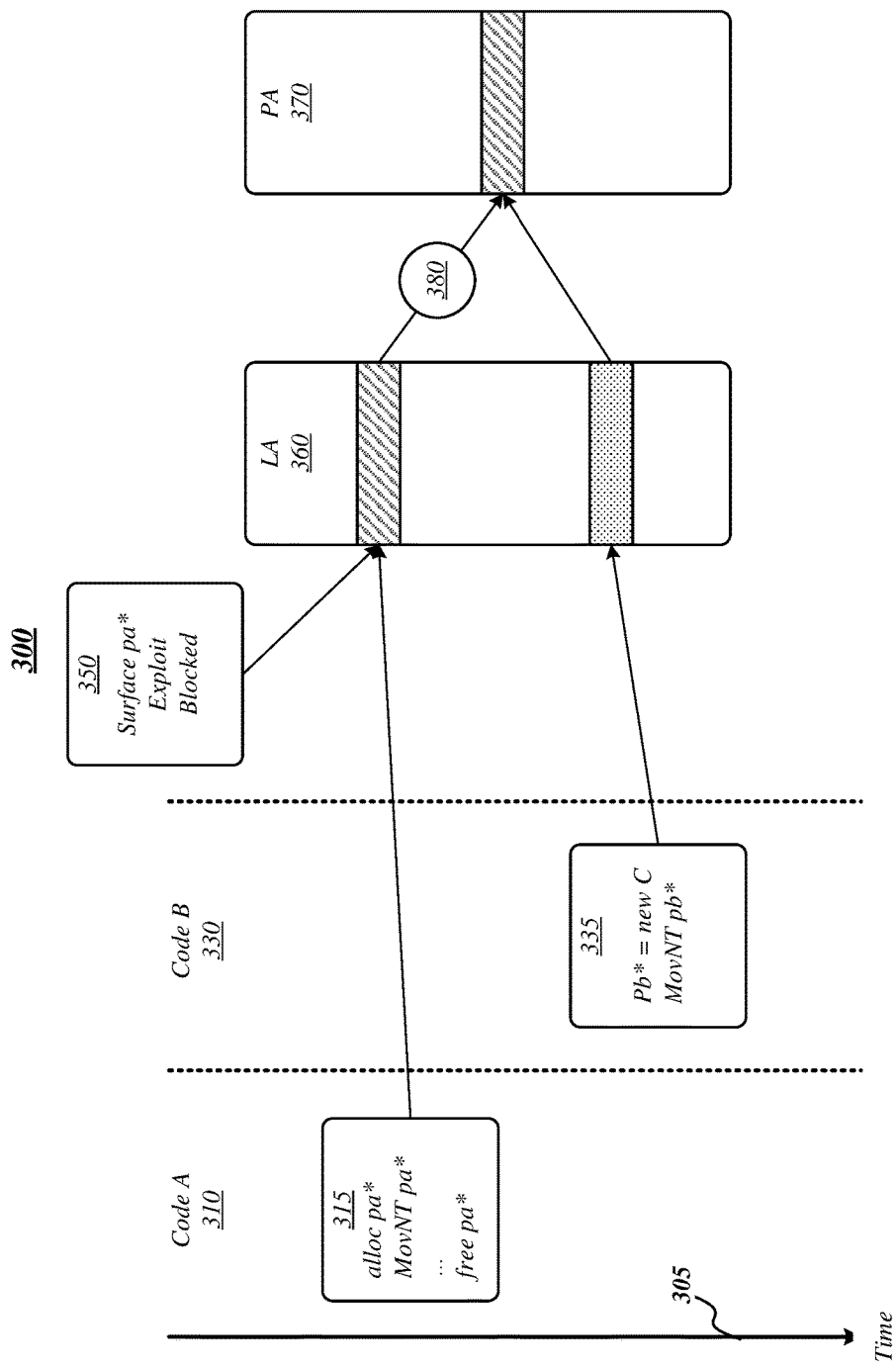
FIG. 3 illustrates an embodiment of a third operating environment.

FIG. 3 illustrates an example of an operating environment 300 such as may be representative of some embodiments. More specifically, operating environment 300 depicts prevention of a use-after-free malware attack. As shown in FIG. 3, processes 315 of Code A 310 and processes 335 of Code B 330 are being executed at different points in time 305. In general, use-after-free malware attacks may occur within the same program. Accordingly, Code A 310 and Code B 330 may be different sections of the same program. Memory allocations colored according to some embodiments are being made in logical address (LA) 360 and physical address (PA) 370. In some embodiments, if a freed memory location is reallocated to another program and the color tag is changed, attempts to reuse a dangling pointer with the old color may be detected by hardware. In the example depicted in FIG. 3, a GPU 350 is mistakenly still using a freed memory location through shared virtual memory (SVM), for example, where both the CPU and GPU 350 may use the same page tables to map LAs 360 to PAs 370. However, because the GPU is still using the old color tag in its address, this software vulnerability is detected at 350 and an integrity failure is averted at 380.

Figure 4:
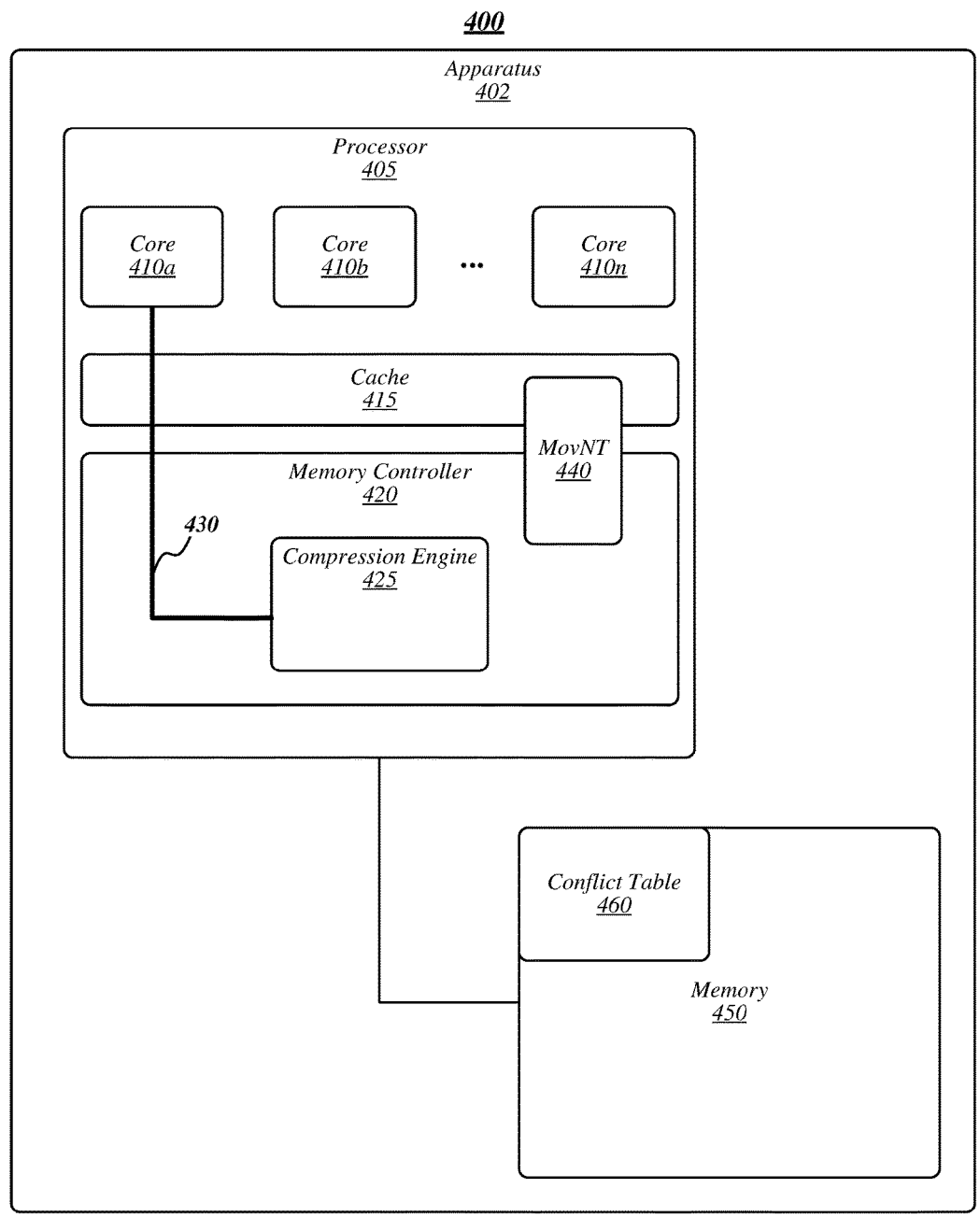
FIG. 4 illustrates an embodiment of a fourth operating environment.

FIG. 4 illustrates an example of an operating environment 400 such as may be representative of some embodiments. In operating environment 400, an apparatus 402 may include a processor 405 having a plurality of cores 410a-n. In some embodiments, in order to directly bind a color tag with data in memory 450, a compression engine 425 may be arranged in or otherwise coupled to a memory controller 420 of the processor 405. In some embodiments, compression engine 425 may be implemented in software, hardware, or some combination thereof. In some embodiments, compression engine 425 may include a hardware compression engine. In some embodiments, compression engine 425 may be placed at the memory controller 420, at or between caches 415 (for example, where a cache hierarchy includes L0, L1, L2 and last level cache LLC, compression engines can be placed between the L2 and LLC caches), and/or at or between cores 410a-n. In various embodiments, compression engine 425 may be placed between caches 415 and cores 410a-n, for example, to provide space to place the associated access control color tag (and compression indicator and metadata) in a cache line/dataline.

As depicted in FIG. 4, in various embodiments, cache lines corresponding to freed address aliases may be flushed 430 from cache 415, for instance, to assure residual freed data does not remain in cache 415. In some embodiments, "write for ownership" processes may be implemented to reassign memory integrity/color tags to new address aliases. Data may be written with a new address alias using non-temporal memory access (for instance, a write without a reaed). In some embodiments, MOVNT instructions 440 (non-temporal moves) may include store instructions operative to write data, for instance, from cache 415 to memory controller 420. Additional or alternative methods may include using memory types for non-cached accesses, write combining operations or other memory operations that cause direct writes to memory. Thus, the newly written color-tagged data may overwrite the previous color-tagged data in memory.

In various embodiments, memory 450 may include or otherwise access a conflict table 460 that may store information for determining the correct form of conflicting non-compressible data according to some embodiments. As some non-compressible lines are indistinguishable from compressed lines, because they conflict with the compression indicator, conflict table 460 may be configured to store conflict information to disambiguate the conflicting non-compressible data. Conflict table 460 may include "conflict lines" (cache line granularity) rows of bits, one bit per cacheline/dataline in memory (thus, the entire table may use only about 0.2% additional memory overhead to map all memory). A table bit may indicate whether the associated conflict was caused because the non-compressible data used the compression indicator, or whether the original non-compressible data conflicted with the conflict indicator. Accordingly, the original conflicting non-compressible data may be properly reconstructed by replacing the conflicting indicator with the correct value from the original data. By using larger indicator values, the probability of conflicts can be reduced, and likewise the additional memory latency and performance impact of retrieving the additional conflict table data from memory can be minimized. Conflict table 460 or portions thereof may also be cached by the processor For example, cache lines that are compressed may be distinguished from cache lines that are not compressed (non-compressed, uncompressed, or uncompressible) and an indicator may be pre-pended to the compressed cache lines. For instance, a four-bit value (such as 1100=(0xC) or "xC") may be used as an indicator. However, some uncompressed cache lines may start with the indicator and would not be able to be distinguished from compressed cache lines. Accordingly, in some embodiments, the portion (for example, a starting portion having a same number of bits as the indicator) of the uncompressed cache line matching the indicator (for instance, 1100) may be removed from the uncompressed cache line and replaced with a replacement value (such as 1101=(0xD) or "xD"), which may operate as the conflict indicator. If the starting portion of the uncompressed cache line having the same number of bits as the indicator (for instance, the first four bits for an indicator of 1100) does not match the indicator, the starting portion is not changed. To restore the starting portion for uncompressed data lines having a modified starting portion, a bit is stored indicating whether the original data of the uncompressed cache line started with the indicator (for instance (0xC)) that was replaced with the replacement value (for instance, (0xD)). Accordingly, deterministic recover of data may be achieved whether the data was compressed or uncompressed.

In various embodiments, conflict table 460 may be extended with color information for conflicting data lines. Such an extension may be useful because setting the conflict indicator on a data line cab then force a color check by the color compression engine when the corresponding conflict line is looked up in the conflict table, even for non-compressible data lines. Typically, non-compressible data lines may be the result of data that is already compressed, encrypted, or otherwise encoded by software. Non-compressible data may also exhibit high locality (for instance, where data lines are fetched contiguously as software decrypts or decompresses content sequentially). Accordingly, by caching conflict data lines, the compression engine is not required to perform additional memory accesses for contiguously accessed data lines that do not compress and are set with the conflict indicator. Such embodiments may increase the size of the conflict table as the conflict table must carry not just one bit per data line, but also the color tag and the original data bits that were replaced by the conflict indicator per data line.

Figure 5:
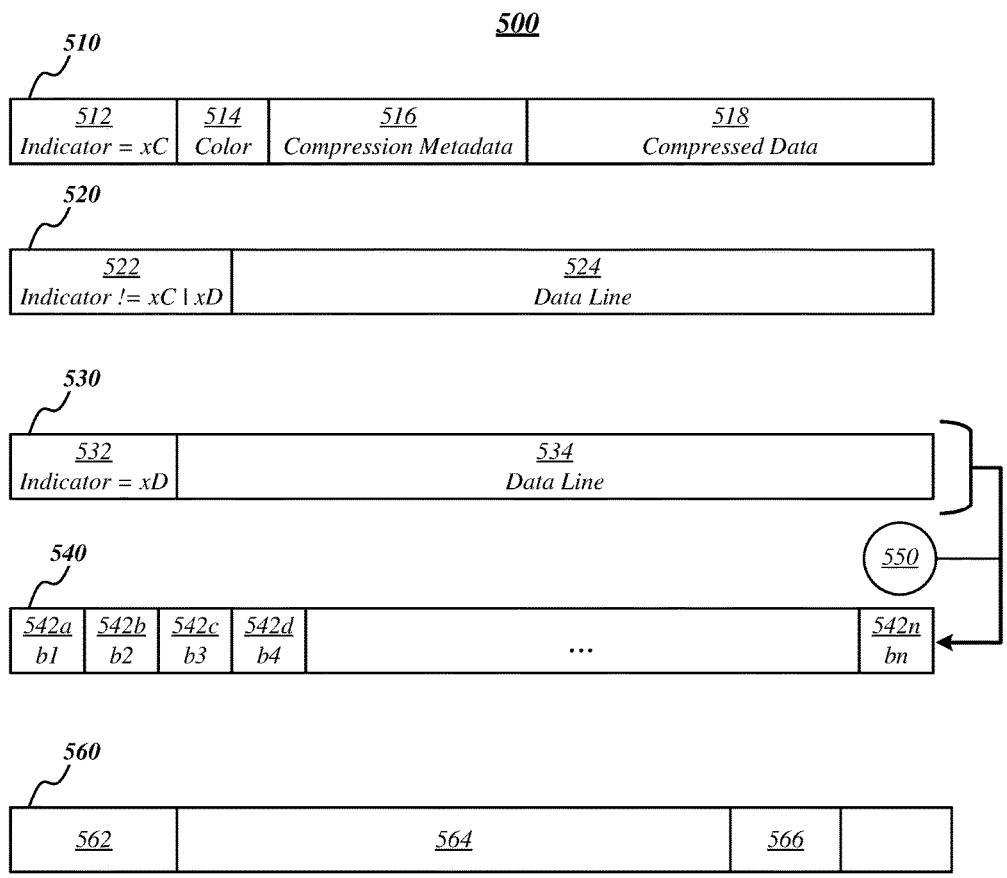
FIG. 5 illustrates an example of compression data formats representative of some embodiments.

FIG. 5 illustrates an example of compression data formats representative of some embodiments. As shown in FIG. 5, data element 510 may include a compression indicator 512. In some embodiments, a compression indicator 512 may determine whether a data line ("line") is compressed (for instance, data element 510 is a "compressed data element"). In some embodiments, one or more specific values may indicate that a data element includes compressed data. For instance, a value of "xC" (compressed) may be a value indicating a data line is compressed. Accordingly, data element 510 includes compressed data as compression indicator 512 has a value of "xC." Accordingly, compression data element 510 may include a color 514, compression metadata 516, and/or compressed data 518.

In contrast, a compression indicator that includes any value besides the specific compression indicator value may indicate that the data line of a data element is not compressed. For example, compression indicator 522 of data element does not have a value of "xC." Accordingly, data line 524 is not compressed (for instance, data element 520 is a "non-compressed data element"). In some embodiments, the value of a compression indicator may be a relatively large number, such that normal non-compressible data may not conflict with the indicator value (for example, if unintentionally interpreted as compressed). However, if there is a conflict, a conflict indicator value (for instance, "xD") may be substituted for the compression indicator. For example, a compression indicator 532 for data element 530 has a value of "xD," indicating a conflict has occurred with non-compressible data that begins with the compression indicator (or conflict indicator) value. In addition, because compression indicator 532 has a value other than "xC," data line 534 is not compressed. In some embodiments, a conflict table (for instance, such as in-memory conflict table 460) may be used to determine a correct form of conflicting non-compressible data. Because memory latency has a major impact on performance, the larger the compression indicator value (for example, from 4 bits/xC to 8 bits/xCC, or 16 bits/xCCCC, and/or the like), the smaller the probability that real data will conflict with the chosen compression indicator value. In some embodiments, a histogram may be used to find a value for the compression indicator value and conflict indicator value least likely to appear in real data. In some embodiments, a histogram may be created to dynamically or periodically, as a system runs, or from boot to boot, find the least conflicting values, and update memory with the current found least conflicting indicator values (replacing the previous indicator values already stored in memory/storage).

In some embodiments, if there is a conflict, as indicated for data element 530, a separate conflicts element 540 ("conflicts line") may be used to determine a correct value of "xD" non-compressed data line 534 from the conflict table. In some embodiments, conflicts line 540 may include bits 542*a-n* for data lines, such as for 512 data lines. In various embodiments, a correction process 550 may be used to replace "xD." For example, correction process 550 may operate to replace "xD" indicator value depending on the value of the corresponding bit in the conflict line. The following provides an example correction process 550 according to some embodiments: b:(if b=1, then replace with xC; else if b=0; replace with xD).

In various embodiments, if a data line can compress, additional metadata 516 may be included to indicate a color 514 associated with compressed data 518. In some embodiments, metadata 516 may include compression metadata used to reconstruct compressed data 518. In general, a cache line may include sufficient information to determine if there is a color 514 value, if there is no color because the data line could not be compressed, and/or if there is a conflicting value.

Data element 560 depicts a physical address according to some embodiments. In various embodiments, a physical address 560 may include unused address bits 562, for example, for indicating color. The physical address bits for color (for instance, bits 562) may alias to the same physical memory location as the compression engine may strip off these bits from the address and place them in the color tag in a compressed cache line on a memory write. Likewise, when reading from memory, the color tag found in the read compressed data line may be compared by the compression engine with unused physical address bits 562 to determine if there is a color mismatch. If there is a conflict indicator in the cache line at the physical address 560, then the index of the corresponding conflict line index in the conflict table can be determined by the address bits 564. The lower physical address bit location selector 566 may then be used to locate the corresponding conflict bit position within the conflict line.

Figure 6:
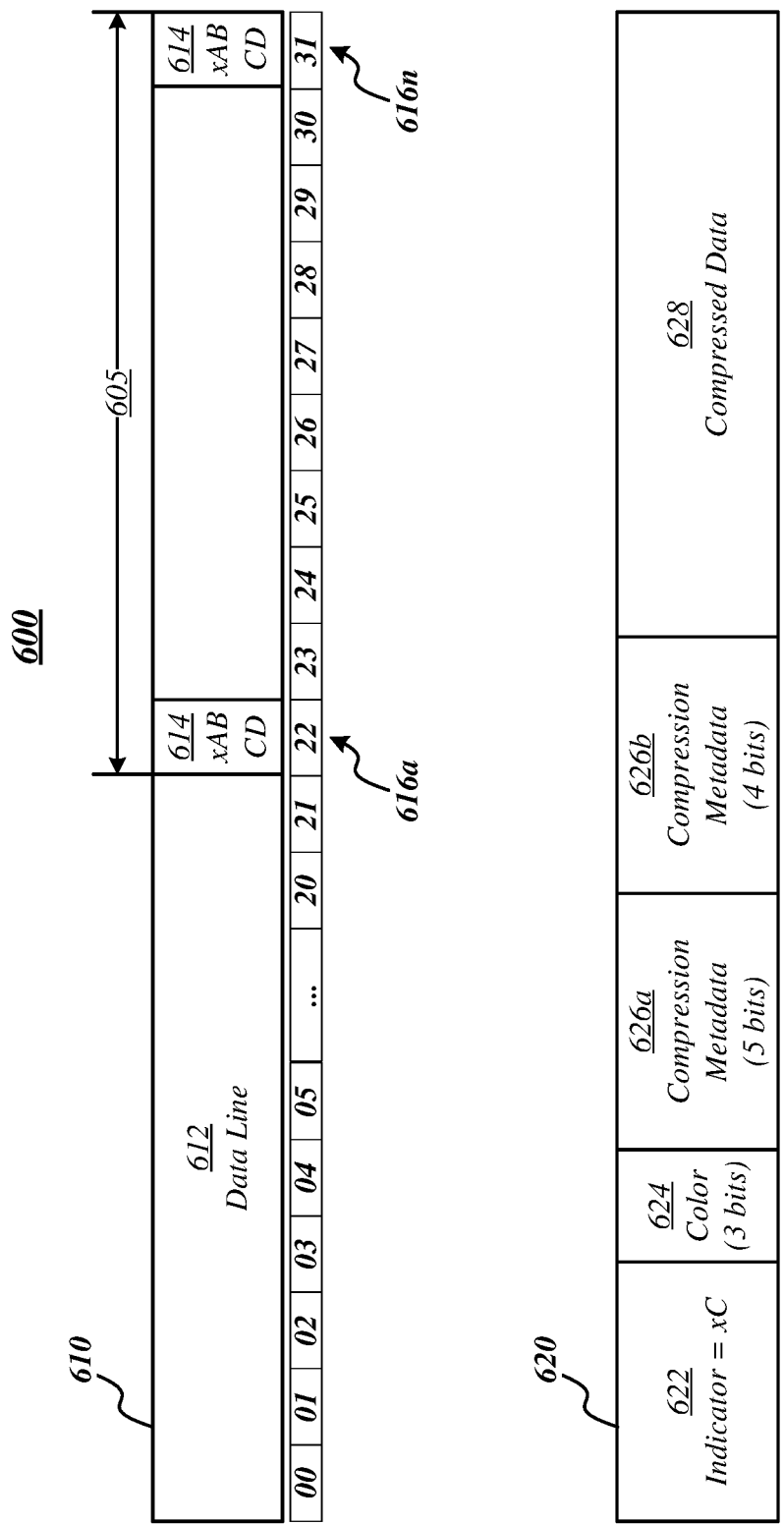
FIG. 6 illustrates an example of compression data formats representative of some embodiments.

FIG. 6 illustrates an example of compression data formats representative of some embodiments. As shown in FIG. 6, a data element 610 may include a data line 612 with repeating words 614 on a 16 bit boundary 605 (for example, a 16 bit sequence repeating on a 16 bit boundary). For example, "xABCD" may repeat within boundary 605 starting at a first particular location 616*a* and ending at a second particular location 616*b* with a specific distance between repeating units. In some embodiment, the repeat word may be concatenated to make space for the compression metadata. Data element 620 may include a compression indicator 622 with a value, for example, of "xC," indicating that data element 620 includes compressed data. Accordingly, data element 620 may include a color tag 624 (for example, 3 bits for color, relating to the color bits 562 in the physical address), compression metadata 626*a* and 626*b* (for example, 9 bits of compression metadata in a 5 bit unit and a 4 bit unit, where the first unit indicates the location of the first repeating word and the second unit indicates the distance from the first to the second repeating word, where the second unit/distance indicator can also wrap around back to the beginning of the cache line to identify the second repeated word location) and compressed data 628.

As shown in FIGS. 5 and 6, data lines with just 2 repeating words may be compressed and a color tag, compression indicator, and compression metadata may be added in the space of a compressed 16 bit redundant word. Various compression processes and algorithms may be used according to some embodiments, including, without limitation, lossless compression algorithms. In some embodiments, compressing three repeating words may operate to provide additional metadata space for other data and/or metadata including, but not limited to, larger color tags, larger compression/conflict indicator values (for instance, translating into less memory lookups to a conflict table), integrity check values (e.g. a SHA3 hash of the original data line), key identifiers, error correcting codes (ECC), and/or the like.

In various embodiments, three repeating bytes may be encoded where compression metadata is in a 32 bit aligned position (for example, the most significant byte of a 32 bit integer) of the first repeating byte of the 32 bit interval distance to the second and third bytes. In such embodiments, the first repeating byte may be a position encoded as 4 bits and the 32 bit interval distance to the second and third may be three bits each, where the value 0 means that the next byte is adjacent, 1 means the next byte is 32 bits away, 2 means the next byte is 64 bits away, 3 means the next byte is 96 bits away, and so on. Accordingly, 6 bits may be remaining for color and the compression/conflict indicator (for instance, may be 3 bits each).

In some embodiments, compressed data lines may also be encrypted before they are written to memory. In various embodiments, compression may be performed before encryption when data is being written to memory and, in some embodiments, decompression may occur before decryption when data is being read from memory. This is because encryption will produce a pseudo random sequence of cipher text bits that is unlikely to compress after encryption.

In various embodiments that combine compression, color, and encryption, physical address bits 562 may be used as an encryption key identifier, allowing the compression/encryption engine to use a different encryption key for each color value (for example, the compression/encryption engine may holds a table of keys 180 indexed by the color value, where the keys are securely established by the security subsystem 174 and/or security controller 120). In such embodiments, the compression indicator 512 and/or color 514 may remain unencrypted. For example, a block cipher (such as AES in ECB or XTS mode), which operates on a 128 bit block size, can overlap the last encryption block (for example, end of data 518) with the cipher text of the first encryption block (for example, the block containing compression metadata 516, after it was encrypted as part of the first block), double encrypting a portion of the first block as part of the last block to accommodate the unencrypted compression indicator value and/or color data. Then, on a memory read operation, an encrypted compressed block may be decrypted by decrypting the last block overlapping with a portion of the first block, followed by decrypting the third block, second block and then finally the first block including the decrypted overlapping portion with the first block (decrypting the four 128 bit blocks in the reverse order). This may prevent replay of data since using the wrong encryption key to decrypt the compressed data will cause data corruption on the memory read attempt and then produce non-compressible data on subsequent memory write operation, destroying the original data in memory and preventing its replay when reading it again using the original (correct) encryption key. Color tag 514 may also indicate the wrong physical address bits 562 were used to access the compressed data line 510 because its color tag 514 does not match the address bits 562. An error may then be indicated to the processor, security subsystem, and/or software. Non-compressible data lines 520 can be encrypted in full, where the conflict indicator value 532 is used in cases where the resulting cipher text conflicts with the compression indicator value (or conflicts with the conflict indicator value).

Figure 7:
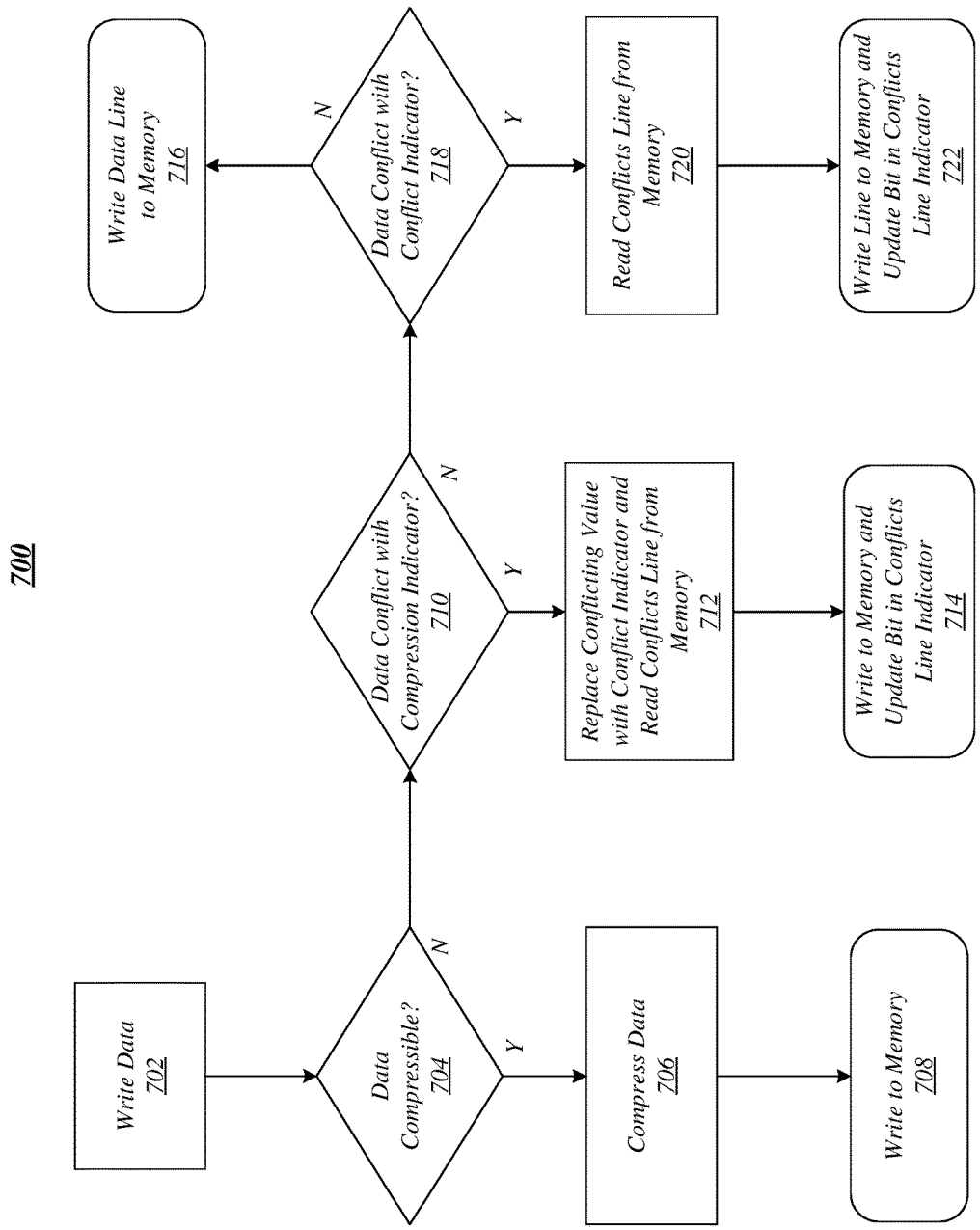
FIG. 7 depicts an illustrative logic flow according to a first embodiment.

Included herein is a flow chart representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation FIG. 7 depicts an illustrative logic flow according to a first embodiment. More specifically, FIG. 7 illustrates one embodiment of a logic flow 700. Logic flow 700 may be representative of some or all of the operations executed by one or more embodiments described herein for writing data according to some embodiments. For example, logic flow 700 may illustrate operations performed by processing device 105 and/or apparatus 402. In some embodiments, a write process may use a color tag from a memory address to include with the compressed data line if compression is possible. In addition, once compressed, the color tag is not required to be carried in the memory address (or otherwise separately stored as metadata) downstream from the compression engine.

In the illustrated embodiment shown in FIG. 7, logic flow 700 may initiate writing data at block 702. At block 704, logic flow 700 may determine whether the data is compressible. For instance, data may be compressible if it includes repeating values and/or other characteristics capable of being compressed. If the data is compressible at block 704, logic flow 700 may compress the data at block 706. For instance, the locations of repeating values may be determined, repeating values may be concatenated, and/or their locations may be written as metadata. At block 708, logic flow 700 may write the data to memory. For example, a data element including a compression indicator, a color, compression metadata, and/or compressed data may be written to memory (such as memory 450). The compressed data may also be encrypted prior to being written to memory If the data is not compressible at block 704, logic flow 700 may determine whether the data conflicts with a compression indicator at block 710. The data may optionally be encrypted at this point in the flow. If the data conflicts with a compression indicator at block 710, logic flow 700 may replace conflicting value(s) with a conflict indicator (for example, "xD") and read the conflicts line from memory. Logic flow 700 may then write the memory line to memory and update a conflicts line indicator at block 714 (for example, by updating a bit corresponding to the data in conflicts line indicator (=1)).

If the data does not conflict with a compression indicator at block 710, logic flow 700 may determine whether the data conflicts with a conflict indicator at block 718. If the data does not conflict with a conflict indicator at block 718, then the logic flow may write the data line to memory at block 716. If the data conflicts with a conflict indicator at block 718, logic flow 700 may read the conflicts line from memory at block 720. Logic flow 700 may write the conflicts line to memory and update the conflicts line indicator at block 722 (for example, by updating a bit in conflicts line indicator (=0)).

Figure 8:
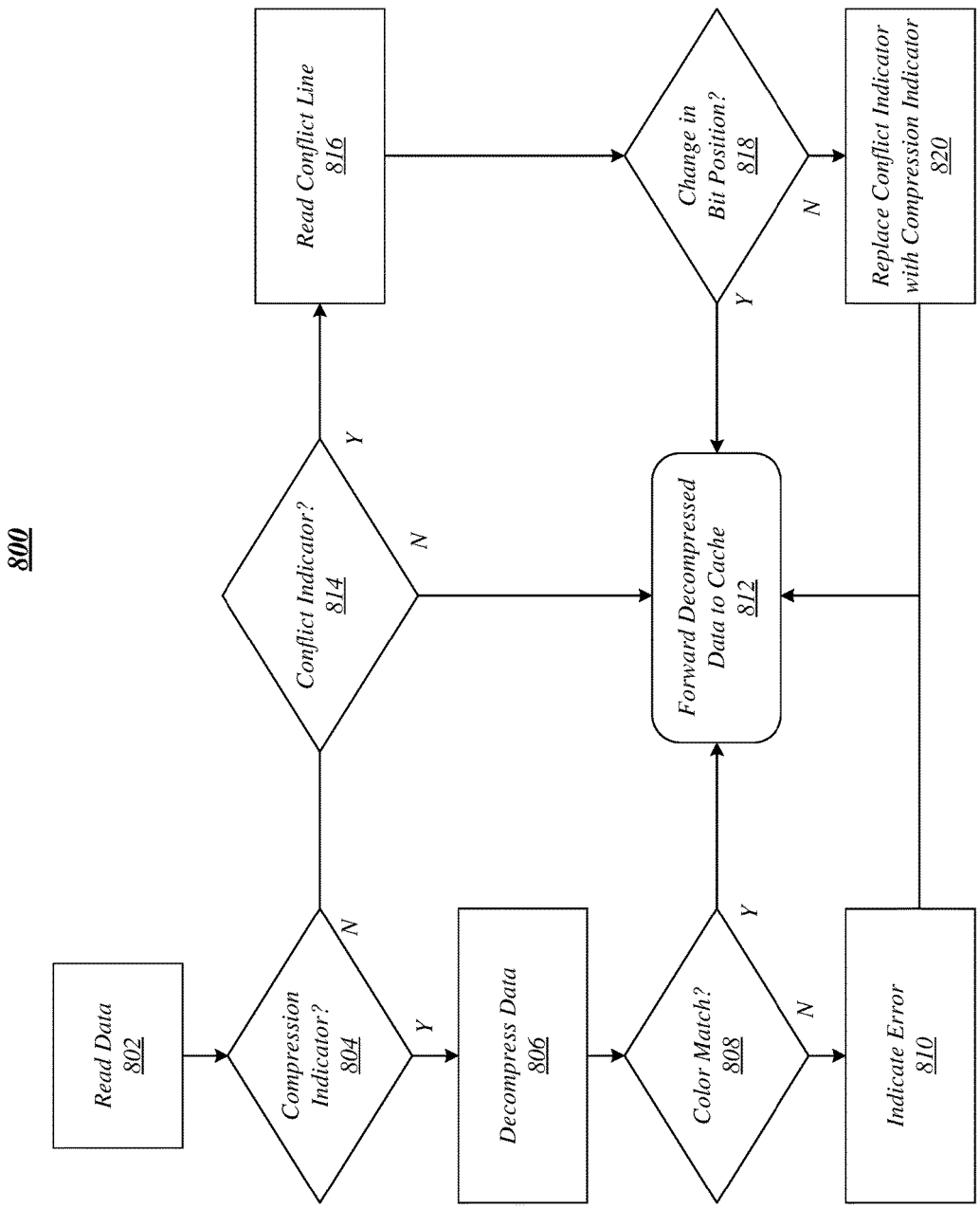
FIG. 8 depicts an illustrative logic flow according to a second embodiment.

FIG. 8 depicts an illustrative logic flow according to a second embodiment. More specifically, FIG. 8 illustrates one embodiment of a logic flow 800. Logic flow 800 may be representative of some or all of the operations executed by one or more embodiments described herein for reading data according to some embodiments. For example, logic flow 800 may illustrate operations performed by processing device 105 and/or apparatus 402.

In the illustrated embodiment shown in FIG. 8, logic flow 800 may initiate reading data at block 802. At block 804, logic flow 800 determines whether the data element includes a compression indicator. For example, data element 510 includes compression indicator 512 with a value of "xC," indicating that the data is compressed. If logic flow 800 determines at block 804 that the data element includes a compression indicator, logic flow 800 may decompress data at block 806 (if the data is also encrypted, the data may be decrypted prior to decompression). For instance, logic flow 800 may note the color value and decompress the data by inserting repeating values at metadata offsets). At block 808, logic flow 800 may determine whether there is a color match (for example, between the color tag and associated PA bits). For example, if a data line could be compressed, the color tag included in the compressed cache line may be compared with the color bits in the address used to access the data to determine if the color is a match. If logic flow 800 determines at block 808 that there is not a color match, logic flow 800 may indicate an error at block 810 (for example, by setting the poison bit for the associated cache line) and then forward decompressed data to cache at block 812. In some embodiments, an error may be generated by setting a poison bit indicating an error with a cache line before sending the cache line to the CPU. If a CPU attempts to consume a poisoned cache line, an error may be raised, for instance, to software or the security subsystem, detecting the violation. The poison bit may also be used for error correcting code (ECC) memory. In some embodiments, if a hardware prefetcher mistakenly caused the condition by reading ahead using the last (now incorrect) address, the poison bit may be ignored (for example, the CPU may choose not trigger any error, when the poisoned cacheline was consumed) as the poisoned cache line was never meant to be consumed by software. In an embodiment in which a cache does not support a poison bit, certain cache line values may be used to indicate color match errors. For instance, all or a portion of a cache line may be replaced with an error value indicating an error. A CPU reading a cache line with an error value, the cache line may be treated as an error by the CPU core.

If logic flow 800 determines at block 808 that there is a color match, logic flow 800 may forward decompressed data to cache at block 812, for example, without error. If logic flow 800 determines at block 804 that the data element does not have a compression indicator, logic flow 800 may determine whether the data element includes a conflict indicator at block 814. If the cache line could not be compressed, then no color comparison at block 808 is required because the cache line does not include a color ("color free"). In general, most lines may compress (for example, between 90-99% of lines may be compressed according to some embodiments), therefore making it difficult for malware or software vulnerabilities to determine whether a given data address may be color free or not.

If logic flow 800 determines that the data element does not include a conflict indicator at block 814, logic flow 800 may forward the non-compressible data (and decrypt the data if it was previously encrypted) directly to cache at block 812. If logic flow 800 determines that the data element does include a conflict indicator at block 814, logic flow 800 may read the conflict line associated with the data's address at block 816. For instance, logic flow 800 may read the conflict line from memory or from a cache. At block 818, logic flow 800 may determine whether there is a change in a corresponding bit position. For instance, logic flow 800 may determine if a corresponding bit position is equal to zero (for instance, no change in the original data included the conflict indicator). At block 820, logic flow 800 may replace the conflict indicator with a compression indicator to restore the original data line (and then decrypt the data if it was previously encrypted).

Figure 10:
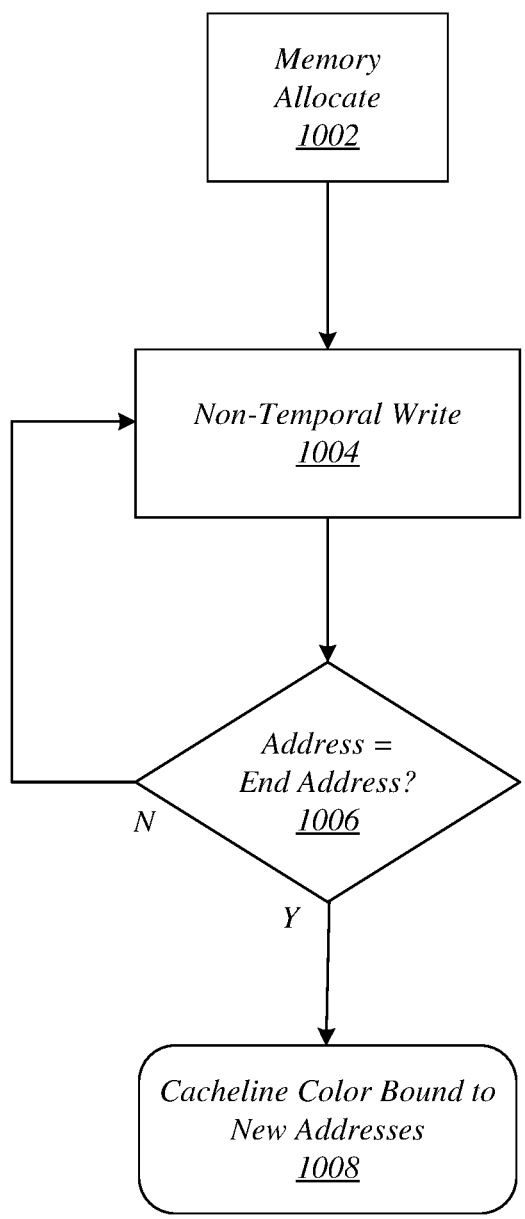
FIG. 10 depicts an illustrative logic flow according to a fourth embodiment.

In some embodiments, a program may take ownership of memory, for instance, by coloring memory by writing to the portion of memory before first reading it (see, for instance, FIG. 10). For example, a program may take ownership of memory because the color checks may be performed by the hardware on read flows. When writing memory, if the cache line can be compressed, whatever color tag was in the address used to write the data may then be bound with the data line in memory.

In various embodiments, when freeing memory so it may be reallocated to another program, the software memory manager (for instance, a heap manager) may first flush the cache of the old address with the old color tag. When memory is then allocated, the software memory manager may then write for ownership (for example, by using a non-temporal write) to initialize the memory with the new color, thus ensuring that the initial data may be bound with the new (and correct) color tag. In some embodiments, compilers may provide for the same functionality for call stacks, just-in-time (JIT) code, loading a container image, loading a VM image, and/or the like. Applying colors according to such embodiments may operate to separate different structures on a memory heap, stack, and/or the like and may prevent reuse attacks or detect bugs in software so that they may be corrected before being exploited.

Figure 9:
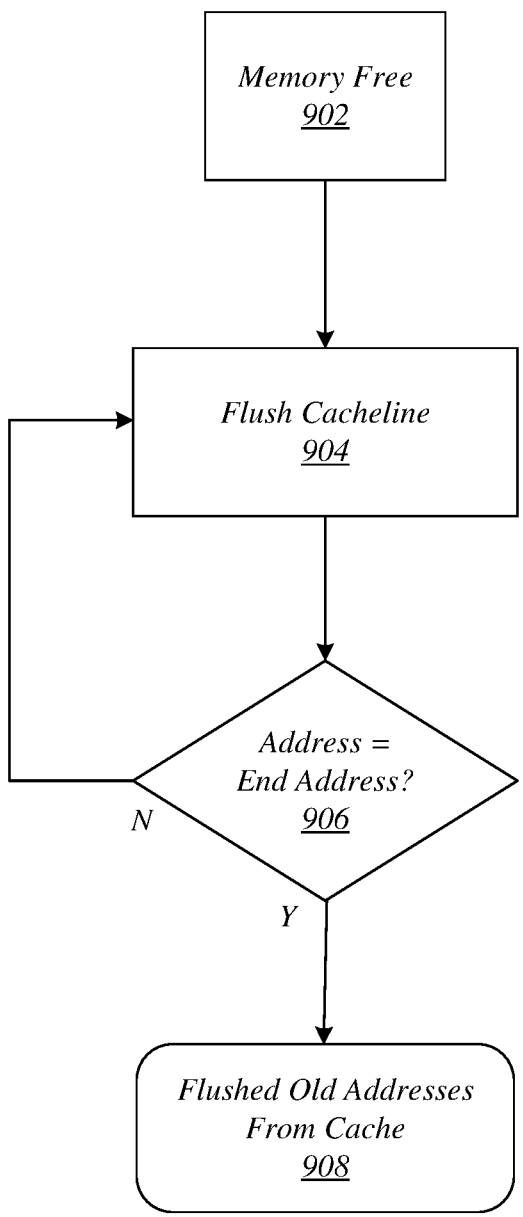
FIG. 9 depicts an illustrative logic flow according to a third embodiment.

FIG. 9 depicts an illustrative logic flow according to a third embodiment. More specifically, FIG. 9 illustrates one embodiment of a logic flow 900. Logic flow 900 may be representative of some or all of the operations executed by one or more embodiments described herein for reassigning address aliases through a color memory compression engine. For example, logic flow 900 may illustrate operations performed by processing device 105 and/or apparatus 402.

In the illustrated embodiment shown in FIG. 9, logic flow 900 may initiate a memory free process at block 902 from a starting address ("Address") to an ending address ("EndAddress"). At block 904, logic flow 900 may flush cache lines in an address range (for instance, from "Address" to "EndAddress"). Logic flow 900 may determine whether a current address is equal to the ending address (for example, whether "Address++"="EndAddress") at block 906. If the current address does not equal the ending address, logic flow 900 may return to block 904 to continue flushing cache lines within the address lines. If the current address does equal the ending address, logic flow 900 may determine that the old addresses have been flushed form the cache at block 908. Alternatively or additionally, all the cache contents can be flushed back to memory to ensure the memory is current before reassigning memory contents with new color tags, for example, via logic flow 1000 of FIG. 10.

FIG. 10 depicts an illustrative logic flow according to a fourth embodiment. More specifically, FIG. 10 illustrates one embodiment of a logic flow 1000. Logic flow 1000 may be representative of some or all of the operations executed by one or more embodiments described herein for a "write-for-ownership," for instance, for a program to take ownership of memory by coloring memory by writing to the portion of memory before first reading it. For example, logic flow 1000 may illustrate operations performed by processing device 105 and/or apparatus 402.

In the illustrated embodiment shown in FIG. 10, logic flow 1000 may initiate a memory allocation process at block 1002, for instance, from a starting address ("Address") to an ending address ("EndAddress"). At block 1004, logic flow 1000 may initiate a non-temporal write of initial data. For example, a program may initiate a non-temporal write of initial data (0), such as through a "MOVNTQD(address, 0) process."). Logic flow 1000 may determine whether a current address is equal to the ending address (for example, whether "Address++"="EndAddress") at block 1006. If the current address does not equal the ending address, logic flow 1000 may return to block 1004 to continue the execution of non-temporal writes of initial data. If the current address does equal the ending address, logic flow 1000 may determine the cache line color is now bound to the new address range (e.g., from "Address" to "EndAddress").

Figure 11:
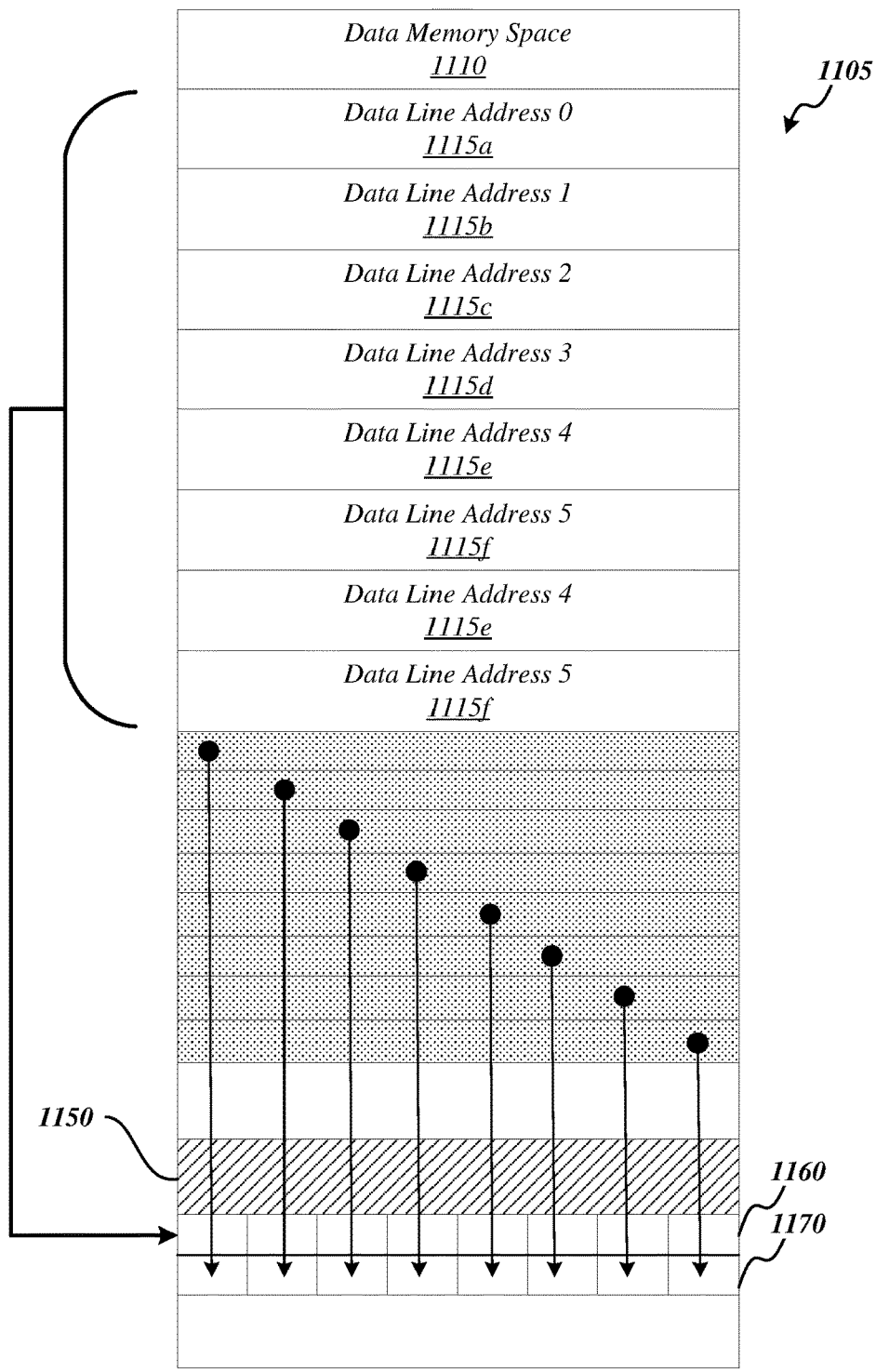
FIG. 11 illustrates an embodiment of a fifth operating environment.

FIG. 11 illustrates an example of an operating environment 1100 such as may be representative of some embodiments. In operating environment 1100, a memory 1105 may include a data memory space 1100 and a plurality of data line addresses 1115a-1115f. Memory 1105 may include or otherwise access a conflict table memory space 1150 that includes a plurality of conflict line addresses, such as conflict line address 1000 1160 and conflict line address 1001 1170. In some embodiments, color may be part of the physical memory address (see, for example, data element 560 of FIG. 5), utilizing an upper address that are unused because not all addressable memory is populated in a system. As the caches need to carry all address bits, even if a system has insufficient external memory, these bits may be reused to store a color tag. For example, moving the color compression engine closer to the CPU core may alleviate a need for caches to carry the additional address bits (or other forms of metadata to indicate color). For instance, placing the compressing engine between the L2 and last level caches may remove the need for the larger LLC to carry the color address bits or metadata.

In various embodiments, the physical address color tag may be set by directly mapping a virtual address to the PA color, or any virtual memory page can be mapped to select the physical address and its color using page tables. For instance, mapping a virtual memory page may allow for 32 bit programs to selectively apply color page by page by using page tables and aliasing (see, for instance, FIG. 12).

Figure 12:
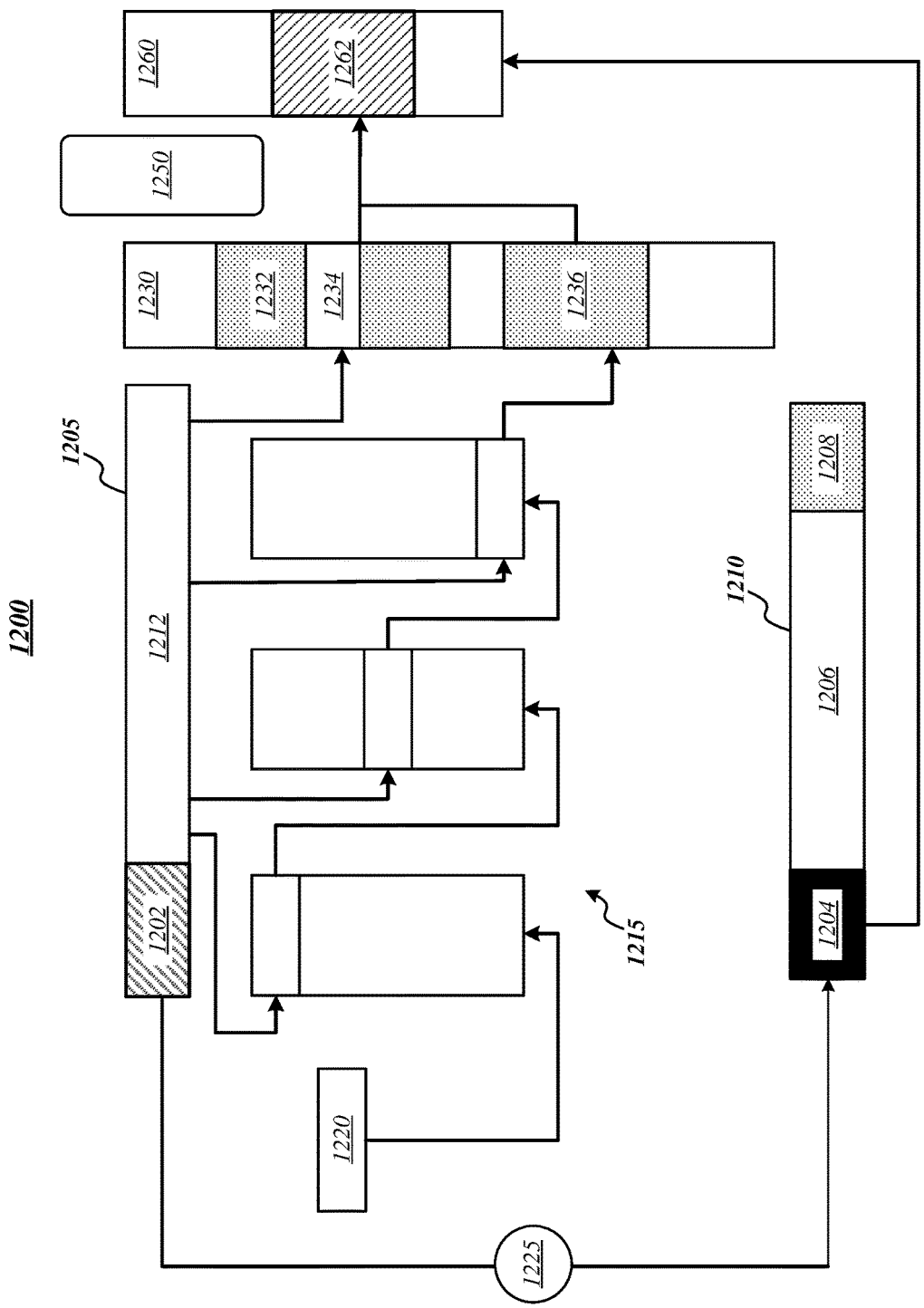
FIG. 12 illustrates an embodiment of a sixth operating environment.

FIG. 12 illustrates an example of an operating environment 1200 such as may be representative of some embodiments. More specifically, FIG. 12 depicts virtual to physical memory remapping with colors according to various embodiments. In operating environment 1200, virtual address 1205 may include a 64-bit virtual address associated with a color 1202 and data 1212. In some embodiments, virtual address 1205 may include non-canonical color 1202. Virtual address 1205 may proceed via a pass-through process 1225 to a physical address 1210. In some embodiments, pass-through process 1225 may be configured to translate virtual (for instance, linear) address to a guest physical address (for instance, physical address 1210). In various embodiments, physical address 1210 may include a physical color 1204, a conflict line index 1206, and a conflict bit selector 1208. Conflict line index 1206 and conflict bit selector (within a conflict line) may form a data line physical address (for instance, an actual location in memory).

As shown in FIG. 12, data 1212 from virtual address 1205 may proceed through an operating system (OS) page table 1215. A CR3 register 1220 (for instance, a page directory pointer) may operate as a pointer to OS page table 1215. A guest physical memory 1230 may include a color 1 physical page 1232 having a guest physical address 1234 and a color 2 physical page 1236. A memory compressor component 1250 may operate according to some embodiments to translate the aliased guest physical addresses into the same physical addresses in memory. As shown in FIG. 12, a physical memory 1260 may include a page in physical memory 1262, for instance, for the contents of the guest physical addresses translated by memory compressor component 1250. The applied color 1204 of physical address 1210 may be used to access physical memory 1260. In various embodiments, color may be directly assigned by the processor hardware and is not addressable by software. For example, a VM or container may be assigned a color tag by the processor. In such embodiments, the color bits 562 in the physical address are set by the processor core when the associated VM or container is running on a core.

In some embodiments, memory compression coloring techniques may be applied to disambiguate conflicting data lines, for example, by only considering a data line compressible if the data line has multiple additional repeating values. For example, memory compression coloring techniques in which two words are compressed, leaving 16 bits for metadata, may require that one or more additional bytes in a cache line needs to match one of the bytes in the repeating word or the data line will not compress. Such requirements may not necessitate an additional encoding to locate the additional repeating values (thus, not requiring more metadata space), while reducing a probability that a data conflict may occur with the compression indicator.

In some embodiments, a bypass value (for example, a color value of zero) may be used to bypass compression/decompression. For example, compression/decompression bypass may be made available on certain system software, such as privileged system software, for instance, for purposes such as paging, I/O, VM migration, and/or the like. As the colors (if applied to the data) are stored in line with the data, the bypass value may allow the compressed data to be directly read and written (for instance, the compression/decompression hardware may not be activated if the bypass value is used in the accessing memory address). Accordingly, a page may be read with the bypass color, stored to disk, external storage, and/or the like with the color information included, and then the bypass color may be used to rewrite the color and data back to memory (in addition, the conflict table information may be saved and restored in a similar manner.)

Figure 13:
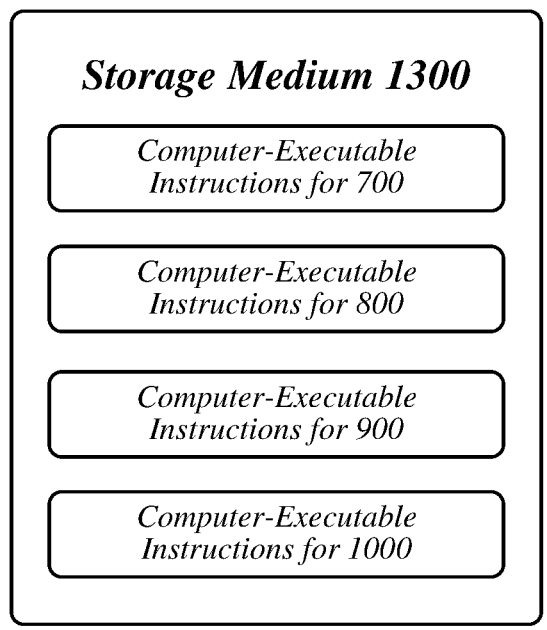
FIG. 13 illustrates an example of a storage medium.

FIG. 13 illustrates an example of a storage medium 1300. Storage medium 1300 may comprise an article of manufacture. In some examples, storage medium 1300 may include any non-transitory computer readable medium or machine readable medium, such as an optical, magnetic or semiconductor storage. Storage medium 1300 may store various types of computer executable instructions, such as instructions to implement logic flow 700, logic flow 800, logic flow 900, and/or logic flow 1000. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 14:
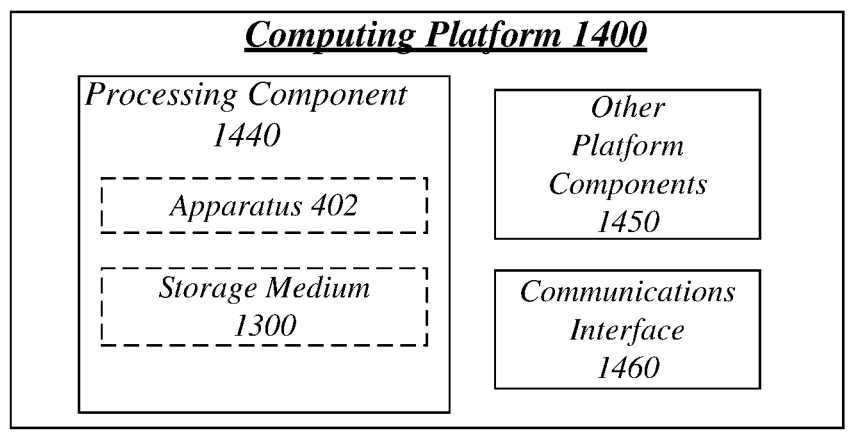
FIG. 14 illustrates an example computing platform.

FIG. 14 illustrates an example computing platform 1400. In some examples, as shown in FIG. 14, computing platform 1400 may include a processing component 1440, other platform components or a communications interface 1460. According to some examples, computing platform 1400 may be implemented in a computing device such as a server in a system such as a data center. Embodiments are not limited in this context.

According to some examples, processing component 1440 may execute processing operations or logic for apparatus 420 and/or storage medium 1300. Processing component 1440 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1450 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1460 may include logic and/or features to support a communication interface. For these examples, communications interface 1360 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 1400 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 1400 described herein, may be included or omitted in various embodiments of computing platform 1400, as suitably desired.

The components and features of computing platform 1400 may be implemented using any combination of discrete circuitry, ASICs, logic gates and/or single chip architectures. Further, the features of computing platform 1400 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 1400 shown in the block diagram of FIG. 14 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Example 1 is an apparatus including at least one memory, at least one processor, and logic to perform compression memory coloring, at least a portion of the logic comprised in hardware, the logic to: determine whether data to be written to memory is compressible, generate a compressed data element responsive to determining data is compressible, the data element comprising a compression indicator, a color, and compressed data, and write the compressed data element to memory.

Example 2 is the apparatus of Example 1, the compression indicator to indicate whether the compressed data element comprises compressed data.

Example 3 is the apparatus of Example 1, the color comprising at least a portion of a memory address.

Example 4 is the apparatus of Example 1, the color comprising metadata.

Example 5 is the apparatus of Example 1, the color comprising metadata to access control code in the at least one memory.

Example 6 is the apparatus of Example 1, the color comprising metadata to access data in the at least one memory.

Example 7 is the apparatus of Example 1, the logic to generate the compressed data element comprising compression metadata.

Example 8 is the apparatus of Example 1, the logic to generate the compressed data element comprising compression metadata to reconstruct the compressed data.

Example 9 is the apparatus of Example 1, comprising a compression engine, the compression engine comprising the logic for compression memory coloring.

Example 10 is the apparatus of Example 1, comprising a compression engine, the compression engine arranged within a memory controller of the processor.

Example 11 is the apparatus of Example 1, comprising a compression engine, the compression engine arranged between at least one cache and at least one core of the processor.

Example 12 is the apparatus of Example 1, the logic to determine whether there is a data conflict with the compression indicator.

Example 13 is the apparatus of Example 1, the logic to determine whether there is a data conflict with the compression indicator responsive to determining that the data is non-compressible.

Example 14 is the apparatus of Example 1, the logic to generate a non-compressible data element responsive to determining a data conflict.

Example 15 is the apparatus of Example 1, the logic to generate a non-compressible data element responsive to determining a data conflict, the non-compressible data element comprising non-compressed data and a compression indicator comprising a conflict indicator.

Example 16 is the apparatus of Example 1, the logic to generate a non-compressible data element responsive to determining a data conflict, the non-compressible data element comprising non-compressed data and a compression indicator comprising a conflict indicator indicting that the non-compressed data is not compressed.

Example 17 is the apparatus of Example 1, the memory comprising a conflict table for storing conflict information for disambiguating non-compressible conflicting data.

Example 18 is the apparatus of Example 1, the logic to determine whether data to be written to memory is compressible based at least in part on whether the data comprises repeating values.

Example 19 is the apparatus of Example 1, the logic to write at least one location of a repeating value of the data in compression metadata of the compressed data element.

Example 20 is the apparatus of Example 1, the logic to determine whether the data conflicts with a conflict indicator responsive to determining that the data is non-compressible.

Example 21 is the apparatus of Example 1, comprising reading logic to read a data element generated via compression memory coloring, at least a portion of the logic comprised in hardware, the reading logic to: determine whether the data element comprises the compression indicator: determine a color value of compressed data element, decompress the compressed data to generate decompressed data, determine whether the color value matches color in an address associated with the data element, and read the decompressed data.

Example 22 is the apparatus of Example 21, the reading logic to read the decompressed data to at least one cache of the processor.

Example 23 is the apparatus of Example 21, the reading logic to determine whether the data element comprises a conflict indicator responsive to determining that the data element does not comprise the compression indicator.

Example 24 is a system including the apparatus according to any of Examples 1-23, and at least one network interface.

Example 25 is a method for compression memory coloring, the method including: determining whether data to be written to memory is compressible, generating a compressed data element responsive to determining data is compressible, the data element comprising a compression indicator, a color, and compressed data, and writing the compressed data element to memory.

Example 26 is the method of Example 25, the compression indicator to indicate whether the compressed data element comprises compressed data.

Example 27 is the method of Example 25, the color comprising at least a portion of a memory address.

Example 28 is the method of Example 25, the color comprising metadata.

Example 29 is the method of Example 25, the color comprising metadata to access control code in the at least one memory.

Example 30 is the method of Example 25, the color comprising metadata to access data in the at least one memory.

Example 31 is the method of Example 25, comprising generating the compressed data element comprising compression metadata.

Example 32 is the method of Example 25, comprising generating the compressed data element comprising compression metadata to reconstruct the compressed data.

Example 33 is the method of Example 25, comprising determining whether there is a data conflict with the compression indicator.

Example 34 is the method of Example 25, comprising determining whether there is a data conflict with the compression indicator responsive to determining that the data is non-compressible.

Example 35 is the method of Example 25, comprising generating a non-compressible data element responsive to determining a data conflict.

Example 36 is the method of Example 25, comprising generating a non-compressible data element responsive to determining a data conflict, the non-compressible data element comprising non-compressed data and a compression indicator comprising a conflict indicator.

Example 37 is the method of Example 25, comprising generating a non-compressible data element responsive to determining a data conflict, the non-compressible data element comprising non-compressed data and a compression indicator comprising a conflict indicator indicting that the non-compressed data is not compressed.

Example 38 is the method of Example 25, comprising storing conflict information for disambiguating non-compressible conflicting data in a conflict table.

Example 39 is the method of Example 25, comprising determining whether data to be written to memory is compressible based at least in part on whether the data comprises repeating values.

Example 40 is the method of Example 25, comprising writing at least one location of a repeating value of the data in compression metadata of the compressed data element.

Example 41 is the method of Example 25, comprising determining whether the data conflicts with a conflict indicator responsive to determining that the data is non-compressible.

Example 42 is the method of Example 25, comprising reading a data element generated via compression memory coloring, by: determining whether the data element comprises the compression indicator, determining a color value of compressed data element, decompressing the compressed data to generate decompressed data, determining whether the color value matches color in an address associated with the data element, and reading the decompressed data.

Example 43 is the method of Example 42, comprising reading the decompressed data to at least one cache of the processor.

Example 44 is the method of Example 42, comprising determining whether the data element comprises a conflict indicator responsive to determining that the data element does not comprise the compression indicator.

Example 45 is a computer-readable storage medium that stores instructions for execution by processing circuitry of a computing device for compression memory coloring, the instructions to cause the computing device to: determine whether data to be written to memory is compressible, generate a compressed data element responsive to determining data is compressible, the data element comprising a compression indicator, a color, and compressed data, and write the compressed data element to memory.

Example 46 is the computer-readable storage medium of Example 45, the compression indicator to indicate whether the compressed data element comprises compressed data.

Example 47 is the computer-readable storage medium of Example 45, the color comprising at least a portion of a memory address.

Example 48 is the computer-readable storage medium of Example 45, the color comprising metadata.

Example 49 is the computer-readable storage medium of Example 45, the color comprising metadata to access control code in the at least one memory.

Example 50 is the computer-readable storage medium of Example 45, the color comprising metadata to access data in the at least one memory.

Example 51 is the computer-readable storage medium of Example 45, the instructions to cause the computing device to generate the compressed data element comprising compression metadata.

Example 52 is the computer-readable storage medium of Example 45, the instructions to cause the computing device to generate the compressed data element comprising compression metadata to reconstruct the compressed data.

Example 53 is the computer-readable storage medium of Example 45, the instructions to cause the computing device to determine whether there is a data conflict with the compression indicator.

Example 54 is the computer-readable storage medium of Example 45, the instructions to cause the computing device to determine whether there is a data conflict with the compression indicator responsive to determining that the data is non-compressible.

Example 55 is the computer-readable storage medium of Example 45, the instructions to cause the computing device to generate a non-compressible data element responsive to determining a data conflict.

Example 56 is the computer-readable storage medium of Example 45, the instructions to cause the computing device to generate a non-compressible data element responsive to determining a data conflict, the non-compressible data element comprising non-compressed data and a compression indicator comprising a conflict indicator.

Example 57 is the computer-readable storage medium of Example 45, the instructions to cause the computing device to generate a non-compressible data element responsive to determining a data conflict, the non-compressible data element comprising non-compressed data and a compression indicator comprising a conflict indicator indicting that the non-compressed data is not compressed.

Example 58 is the computer-readable storage medium of Example 45, the instructions to cause the computing device to store conflict information for disambiguating non-compressible conflicting data in a conflict table.

Example 59 is the computer-readable storage medium of Example 45, the instructions to cause the computing device to determine whether data to be written to memory is compressible based at least in part on whether the data comprises repeating values.

Example 60 is the computer-readable storage medium of Example 45, the instructions to cause the computing device to write at least one location of a repeating value of the data in compression metadata of the compressed data element.

Example 61 is the computer-readable storage medium of Example 45, the instructions to cause the computing device to determine whether the data conflicts with a conflict indicator responsive to determining that the data is non-compressible.

Example 62 is the computer-readable storage medium of Example 45, the instructions to cause the computing device to read a data element generated via compression memory coloring, by: determining whether the data element comprises the compression indicator, determining a color value of compressed data element, decompressing the compressed data to generate decompressed data, determining whether the color value matches color in an address associated with the data element, and reading the decompressed data.

Example 63 is the computer-readable storage medium of Example 62, the instructions to cause the computing device to read the decompressed data to at least one cache of the processor.

Example 64 is the computer-readable storage medium of Example 62, the instructions to cause the computing device to determine whether the data element comprises a conflict indicator responsive to determining that the data element does not comprise the compression indicator.

Example 65 is an apparatus including a compressible data means to determine whether data to be written to memory is compressible, a data element generator means to generate a compressed data element responsive to determining data is compressible, the data element comprising a compression indicator, a color, and compressed data, and a data writing means to write the compressed data element to memory.

Example 66 is the apparatus of Example 65, the compression indicator to indicate whether the compressed data element comprises compressed data.

Example 67 is the apparatus of Example 65, the color comprising at least a portion of a memory address.

Example 68 is the apparatus of Example 65, the color comprising metadata.

Example 69 is the apparatus of Example 65, the color comprising metadata to access control code in the at least one memory.

Example 70 is the apparatus of Example 65, the color comprising metadata to access data in the at least one memory.

Example 71 is the apparatus of Example 65, the data element generator means to generate the compressed data element comprising compression metadata.

Example 72 is the apparatus of Example 65, the data element generator means to generate the compressed data element comprising compression metadata to reconstruct the compressed data.

Example 73 is the apparatus of Example 65, comprising a compression engine means, the compression engine means operative to perform compression memory coloring.

Example 74 is the apparatus of Example 65, comprising a compression engine means, the compression engine means operative to perform compression memory coloring, the compression engine means arranged within a memory controller of the processor.

Example 75 is the apparatus of Example 65, comprising a compression engine means, the compression engine means operative to perform compression memory coloring, the compression engine means arranged between at least one cache and at least one core of the processor.

Example 76 is the apparatus of Example 65, comprising a conflict means to determine whether there is a data conflict with the compression indicator.

Example 77 is the apparatus of Example 65, comprising a conflict means to determine whether there is a data conflict with the compression indicator responsive to determining that the data is non-compressible.

Example 78 is the apparatus of Example 65, the data element generator means to generate a non-compressible data element responsive to determining a data conflict.

Example 79 is the apparatus of Example 65, the data element generator means to generate a non-compressible data element responsive to determining a data conflict, the non-compressible data element comprising non-compressed data and a compression indicator comprising a conflict indicator.

Example 80 is the apparatus of Example 65, the data element generator means to generate a non-compressible data element responsive to determining a data conflict, the non-compressible data element comprising non-compressed data and a compression indicator comprising a conflict indicator indicting that the non-compressed data is not compressed.

Example 81 is the apparatus of Example 65, comprising a conflict data storage means for storing conflict information for disambiguating non-compressible conflicting data.

Example 82 is the apparatus of Example 65, the compressible data means to determine whether data to be written to memory is compressible based at least in part on whether the data comprises repeating values.

Example 83 is the apparatus of Example 65, the data element generator means to write at least one location of a repeating value of the data in compression metadata of the compressed data element.

Example 84 is the apparatus of Example 65, the conflict means to determine whether the data conflicts with a conflict indicator responsive to determining that the data is non-compressible.

Example 85 is the apparatus of Example 65, comprising reading means to read a data element generated via compression memory coloring, the reading means to: determine whether the data element comprises the compression indicator: determine a color value of compressed data element, decompress the compressed data to generate decompressed data, determine whether the color value matches color in an address associated with the data element, and read the decompressed data.

Example 86 is the apparatus of Example 85, the reading means to read the decompressed data to at least one cache of the processor.

Example 87 is the apparatus of Example 85, the reading means to determine whether the data element comprises a conflict indicator responsive to determining that the data element does not comprise the compression indicator.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus to provide compression memory coloring, comprising:
    at least one memory;
    at least one processor; and
    logic to perform compression memory coloring, at least a portion of the logic comprised in hardware, the logic to:
        determine whether data to be written to a memory location in memory is compressible,
        generate a non-compressible data element responsive to determining a data conflict,
        generate a compressed data element responsive to determining data is compressible, the compressed data element comprising a compression indicator, a color, and compressed data, wherein the color corresponds to an association of the memory location with one or more processes, and
        write the compressed data element to the memory location in memory.

2. The apparatus of claim 1, the compression indicator to indicate whether the compressed data element comprises compressed data.

3. The apparatus of claim 1, the color comprising at least a portion of a memory address.

4. The apparatus of claim 1, the compressed data element comprising compression metadata.

5. The apparatus of claim 1, comprising a compression engine, the compression engine comprising the logic for compression memory coloring.

6. The apparatus of claim 1, the logic to determine whether there is a data conflict with the compression indicator.

7. The apparatus of claim 1, the memory comprising a conflict table for storing conflict information for disambiguating non-compressible conflicting data.

8. The apparatus of claim 1, comprising reading logic to read a data element generated via compression memory coloring, at least a portion of the logic comprised in hardware, the reading logic to:
    determine whether the data element comprises the compression indicator,
    determine a color value of compressed data element,
    decompress the compressed data to generate decompressed data,
    determine whether the color value matches color in an address associated with the data element, and
    read the decompressed data.

9. The apparatus of claim 8, the reading logic to read the decompressed data to at least one cache of the processor.

10. The apparatus of claim 8, the reading logic to determine whether the data element comprises a conflict indicator responsive to determining that the data element does not comprise the compression indicator.

11. A method to perform compression memory coloring, the method comprising:
    determining whether data to be written to a memory location in memory is compressible;
    generating a non-compressible data element responsive to determining a data conflict;
    generating a compressed data element responsive to determining data is compressible, the compressed data element comprising a compression indicator, a color, and compressed data, wherein the color corresponds to an association of the memory location with one or more processes; and
    writing the compressed data element to the memory location in memory.

12. The method of claim 11, the compression indicator to indicate whether the compressed data element comprises compressed data.

13. The method of claim 11, the color comprising at least a portion of a memory address.

14. The method of claim 11, comprising determining whether there is a data conflict with the compression indicator.

15. The method of claim 11, comprising storing conflict information for disambiguating non-compressible conflicting data in a conflict table.

16. The method of claim 11, comprising reading a data element generated via compression memory coloring, by:
    determining whether the data element comprises the compression indicator,
    determining a color value of compressed data element,
    decompressing the compressed data to generate decompressed data,
    determining whether the color value matches color in an address associated with the data element, and
    reading the decompressed data.

17. A non-transitory computer-readable storage medium that stores instructions for execution by processing circuitry of a computing device to perform compression memory coloring, the instructions to cause the computing device to:
    determine whether data to be written to a memory location in memory is compressible;
    generate a non-compressible data element responsive to determining a data conflict;
    generate a compressed data element responsive to determining data is compressible, the compressed data element comprising a compression indicator, a color, and compressed data, wherein the color corresponds to an association of the memory location with one or more processes; and
    write the compressed data element to the memory location in memory.

18. The non-transitory computer-readable storage medium of claim 17, the compression indicator to indicate whether the compressed data element comprises compressed data.

19. The non-transitory computer-readable storage medium of claim 17, the color comprising at least a portion of a memory address.

20. The non-transitory computer-readable storage medium of claim 17, the instructions to cause the computing device to determine whether there is a data conflict with the compression indicator.

21. The non-transitory computer-readable storage medium of claim 17, the instructions to cause the computing device to store conflict information for disambiguating non-compressible conflicting data in a conflict table.

22. The non-transitory computer-readable storage medium of claim 17, the instructions to cause the computing device to read a data element generated via compression memory coloring, by:

determining whether the data element comprises the compression indicator,
determining a color value of compressed data element,
decompressing the compressed data to generate decompressed data,
determining whether the color value matches color in an address associated with the data element, and
reading the decompressed data.

* * * * *